(12) United States Patent
Shirakawa et al.

(10) Patent No.: US 6,341,899 B1
(45) Date of Patent: Jan. 29, 2002

(54) HYBRID CONNECTOR

(75) Inventors: Tsuguhito Shirakawa; Nobuyuki Akeda; Toshiharu Takahashi, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/545,588

(22) Filed: Apr. 7, 2000

(30) Foreign Application Priority Data

Dec. 8, 1999 (JP) .............................. 11-348499

(51) Int. Cl.$^7$ ................................. G02B 6/36
(52) U.S. Cl. .................. 385/88; 385/53; 385/92; 439/541.5
(58) Field of Search ....................... 385/53, 70, 71, 385/75, 88, 92, 139; 439/527, 540.1, 541.5, 586

(56) References Cited

U.S. PATENT DOCUMENTS

| | | | | |
|---|---|---|---|---|
| 4,449,784 A | * | 5/1984 | Basov et al. ................ 385/88 |
| 5,473,715 A | * | 12/1995 | Schofield et al. ............ 385/53 |
| 5,695,362 A | * | 12/1997 | Hillbish et al. .......... 439/541.5 |
| 5,745,622 A | * | 4/1998 | Birnbaum et al. ............ 385/75 |
| 6,095,698 A | * | 8/2000 | Strab et al. .................... 385/88 |

* cited by examiner

Primary Examiner—Cassandra Spyrou
Assistant Examiner—Euncha Cherry
(74) Attorney, Agent, or Firm—Armstrong, Westerman, Hattori, McLeland, & Naughton, LLP

(57) ABSTRACT

A hybrid connector consists of an electrical connector and an optical connector. The electrical connector includes a housing with a wall having a terminal mount section and an optical connector mount section and terminals bent L-shaped and inserted through the terminal mount section into the electrical housing. The optical connector includes an optical housing, and a light emitting element module and a light receiving element module, both accommodated in the optical housing. The optical housing, when assembled to the electrical housing, overlies the terminals with a spacing therebetween. A compact hybrid connector is obtained.

5 Claims, 18 Drawing Sheets

F I G. 17
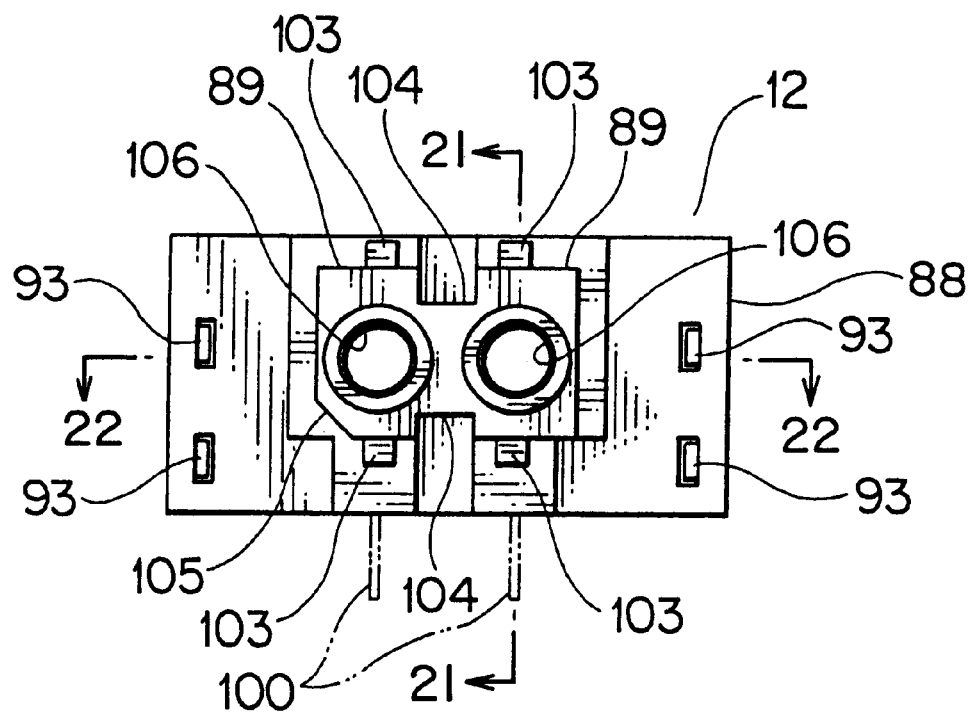
F I G. 18
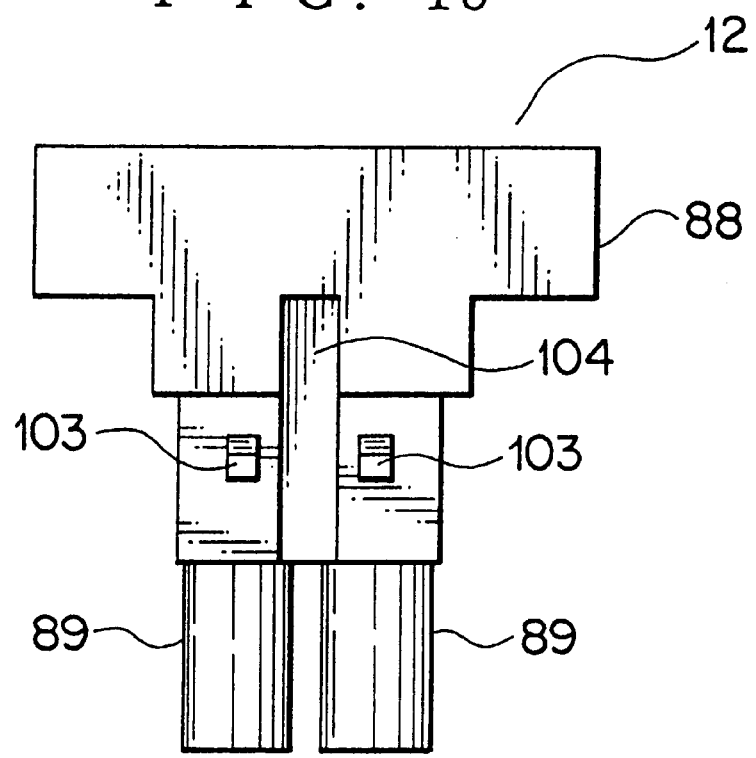

HYBRID CONNECTOR

BACKGROUND OF THE INVENTION

1. Field of the Invention

This invention relates to a hybrid connector including an electrical connector and an optical connector assembled to the electrical connector, which has the functions of the electrical connector and the optical connector.

2. Description of the Related Art

In a vehicle such as an automobile, there are many signals transmitted from various sensors and many signals used to control various electronic components. If these signals are transmitted by using individual signal lines, the number of the signal lines becomes large, resulting in the wiring harness weighing very heavy. In addition, the information transmitted has had large volumes and densities year by year.

To cope with this, in recent years, there has been adopted a system in which part of the wiring harnesses are replaced by optical fiber cables. For example, a connection has been made between nodes by an optical fiber cable.

If the wiring harnesses are partly replaced by optical fiber cables, however, it becomes troublesome to make connections, for example at a carmaker, between related electrical connectors and optical connectors.

Consequently, to complete connection of an electrical connector and an optical connector at one connecting operation, it has been desired to put to use a hybrid connector which combines in one the electrical connector and the optical connector.

If, however, a hybrid connector is constituted by juxtaposing an electrical connector and an optical connector side by side, the resultant hybrid connector becomes upsized in the direction in which the electrical and optical connectors are juxtaposed, possibly affecting the space and circuit construction on a printed circuit board on which to implement the hybrid connector.

SUMMARY OF THE INVENTION

This invention has been accomplished to overcome the above drawback and an object of this invention is to provide a hybrid connector which is compact in size.

In order to attain the object, according to an aspect of this invention, there is provided a hybrid connector having an electrical connector and an optical connector assembled to the electrical connector, the electrical connector comprising: an electrical housing having an open end through which to fit to a mating hybrid connector and a wall at an end thereof opposite the open end, the wall having a terminal mount section and an optical connector mount section juxtaposed to each other in a direction perpendicular to a connector fitting direction of the hybrid connector and the mating hybrid connector, and terminals bent L-shaped which are inserted at one end through the terminal mount section into the electrical housing to have bends thereof located outside the terminal mount section, and the optical connector comprising: an optical housing with an optical element module receiving section; a light emitting element module having a light emitting element; and a light receiving element module having a light receiving element, the light emitting element module and the light receiving element module being accommodated in the optical element module receiving section of the optical housing, wherein when the optical connector is assembled through the optical connector mount section to the electrical connector, the optical housing overlies at the optical element module receiving section at least one of the bends of the terminals, with a spacing therebetween.

In the hybrid connector of the above construction, if the optical connector is assembled to the electrical connector, the optical housing at its optical element module receiving section overhangs or overlies the bends of the terminals with a spacing therebetween. Consequently, the size of the hybrid connector in a width direction thereof, i.e., in the direction perpendicular to the connector fitting direction becomes small by the length by which the optical housing overhangs the terminals.

Further, the optical housing that overhangs serves to protect the terminals.

The term "hybrid connector" used herein is intended to mean a connector with an electrical connector and an optical connector combined in one.

Preferably, the light emitting element is located offcenter in the light emitting element module toward the light receiving element module, and the light receiving element is located off-center in the light receiving element module toward the light emitting element module.

In the above hybrid connector, because the light emitting element and the light receiving element are off-centered toward each other, optical fiber cables leading to the mating optical connector can also be located close to each other, resulting in the mating optical connector and thus the optical connector made compact in size in the width direction.

Advantageously, the optical housing has at the optical element module receiving section a terminal protector extending in the direction perpendicular to the connector fitting direction to overlie the bends of the terminals.

The terminal protector serves to protect the terminals.

According to another aspect of this invention, there is provided a hybrid connector having an electrical connector and a transmitting and receiving optical connectors assembled to the electrical connector, the electrical connector comprising: an electrical housing having an open end through which to fit to a mating hybrid connector and a wall at an end thereof opposite the open end, the wall having two optical connector mount sections and a terminal mount section between the optical connector mount sections, juxtaposed in a direction perpendicular to a connector fitting direction of the hybrid connector and the mating hybrid connector, and terminals bent L-shaped which are inserted at one end through the terminal mount section into the electrical housing to have bends thereof located outside the terminal mount section, and the transmitting optical connector comprising: a transmitting optical housing with a light emitting element module receiving section; and a light emitting element module having a light emitting element, which is accommodated in the light emitting element module receiving section of the transmitting optical housing, and the receiving optical connector comprising: a receiving optical housing with a light receiving element module receiving section; and a light receiving element module having a light receiving element, which is accommodated in the light receiving element module receiving section of the receiving optical housing, wherein when the transmitting and receiving optical connectors are assembled through the respective optical connector mount sections to the electrical connector, the transmitting and receiving optical housings overlie at the light emitting element module and light receiving element module receiving sections the bends of the terminals, with a spacing therebetween.

In the hybrid connector of the above construction, the size of the hybrid connector in a width direction thereof, i.e., in the direction perpendicular to the connector fitting direction becomes small by the length by which the transmitting and receiving optical housings overhang the terminals. Further, the terminals are better protected.

Preferably, the emitting element is located off-center in the light emitting element module toward away from the terminals, and the light receiving element is located off-center in the light receiving element module toward away from the terminals.

The above and other objects, features and advantages of this invention will become apparent from the following description and the appended claims, taken in conjunction with the accompanying drawings.

BRIEF DESCRIPTION OF THE DRAWINGS

FIG. 17 is a front view of an optical housing as in FIG. 2;

FIG. 18 is a plan view of the optical housing;

DESCRIPTION OF THE PREFERRED EMBODIMENT

One embodiment of this invention will now be described with reference to the attached drawings.

Figure 1:
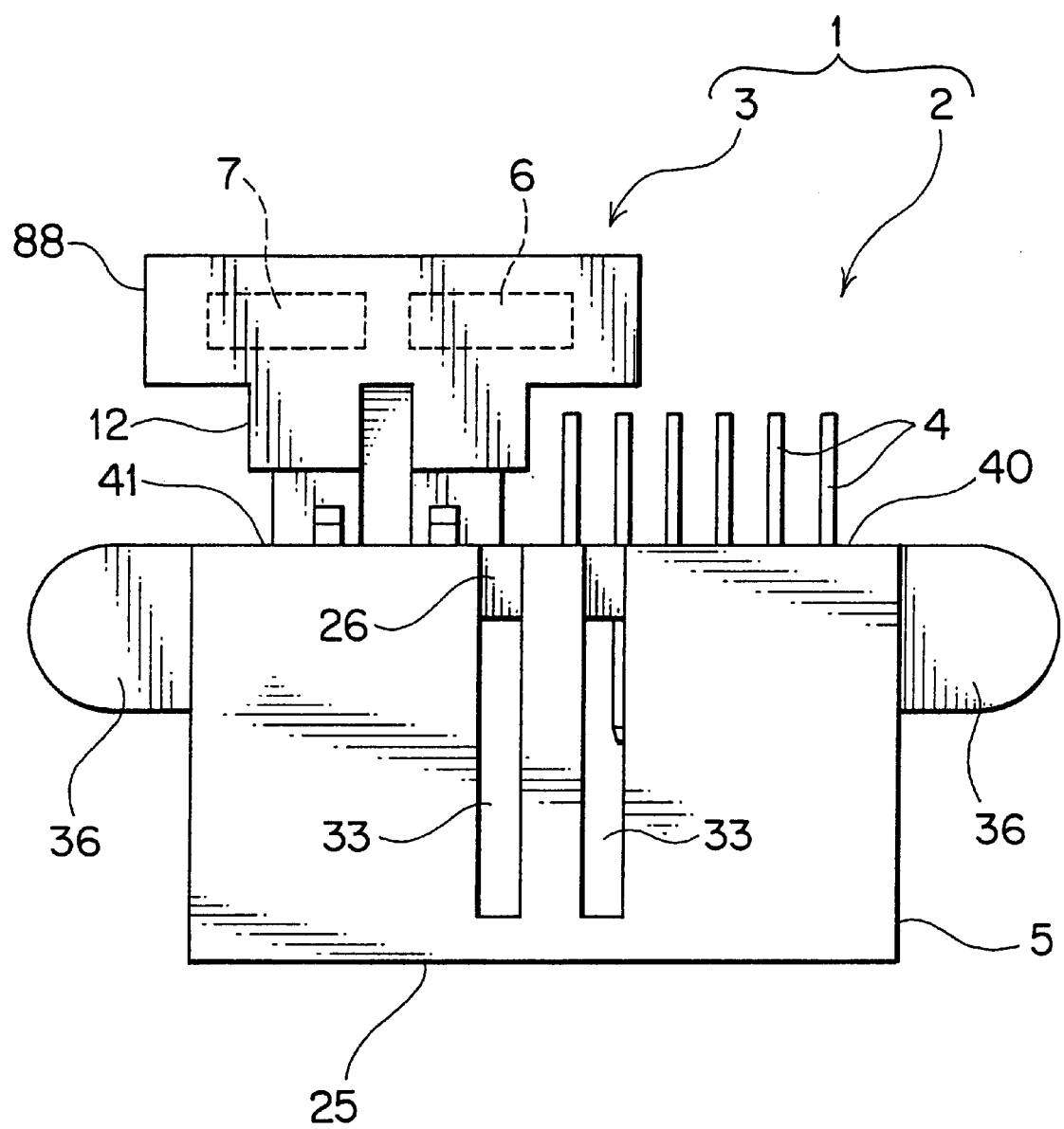
FIG. 1 is a plan view of a hybrid connector of a male type according to one embodiment of this invention.

In FIG. 1, a hybrid connector 1 of a male type, which is implemented on a not-shown printed circuit board, includes a male electrical connector 2 and a male optical connector 3 assembled to the electrical connector 2. As will be later described in detail, the optical connector 3 has a part thereof overhanging PCB terminals 4 of the electrical connector 2, so as to provide a compact construction.

Figure 2:
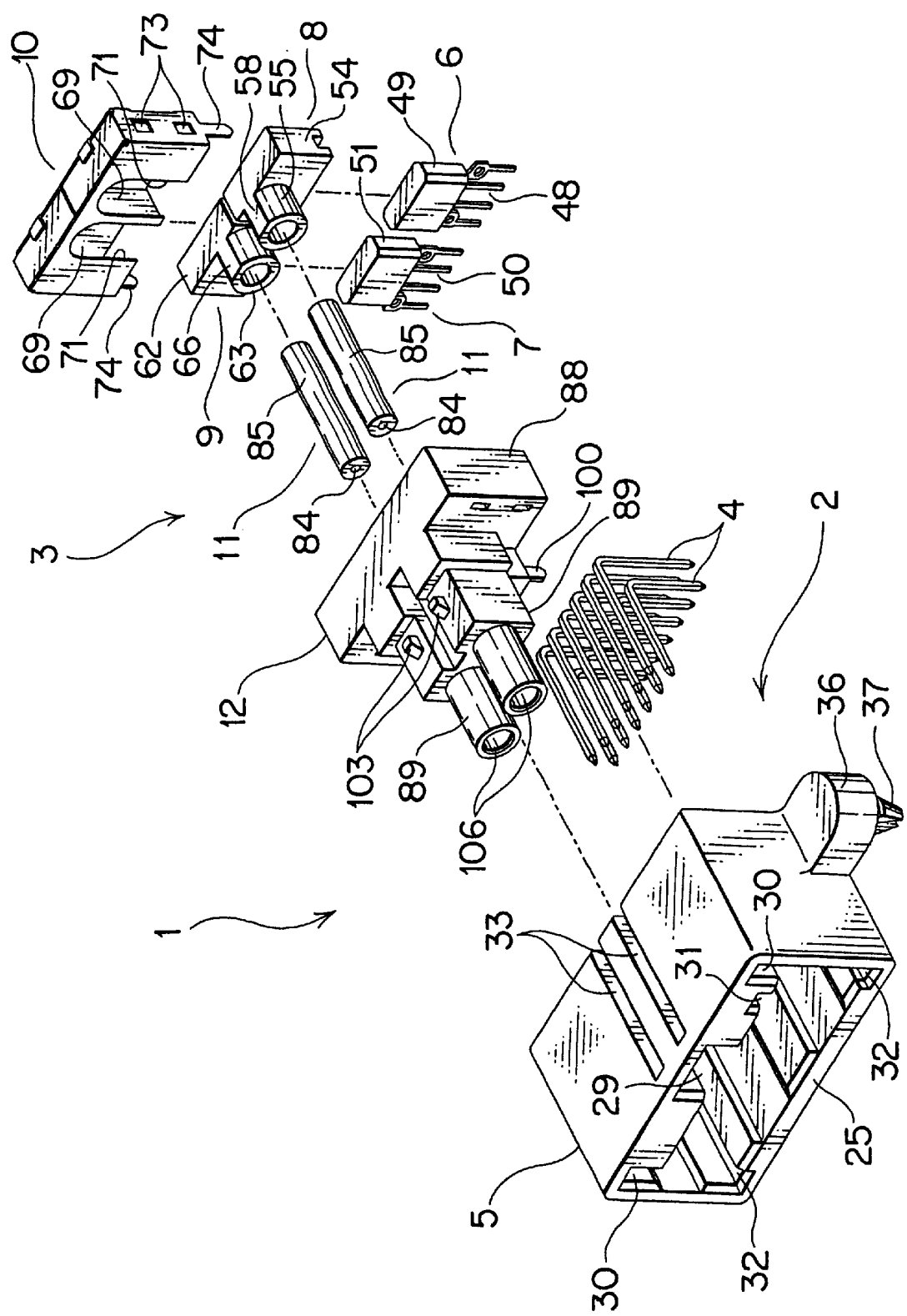
FIG. 2 is an exploded perspective view of the hybrid connector of FIG. 1.

In FIG. 2, the electrical connector 2 includes a plurality of the PCB terminals 4 and an electrical housing 5. The optical connector 3 includes FOTs 6, 7 (FOT: fiber optical transceiver, also referred to as optical (light emitting or light receiving) element module), FOT casings 8, 9, a shield casing 10, sleeves 11, 11, and an optical housing 12.

Figure 3:
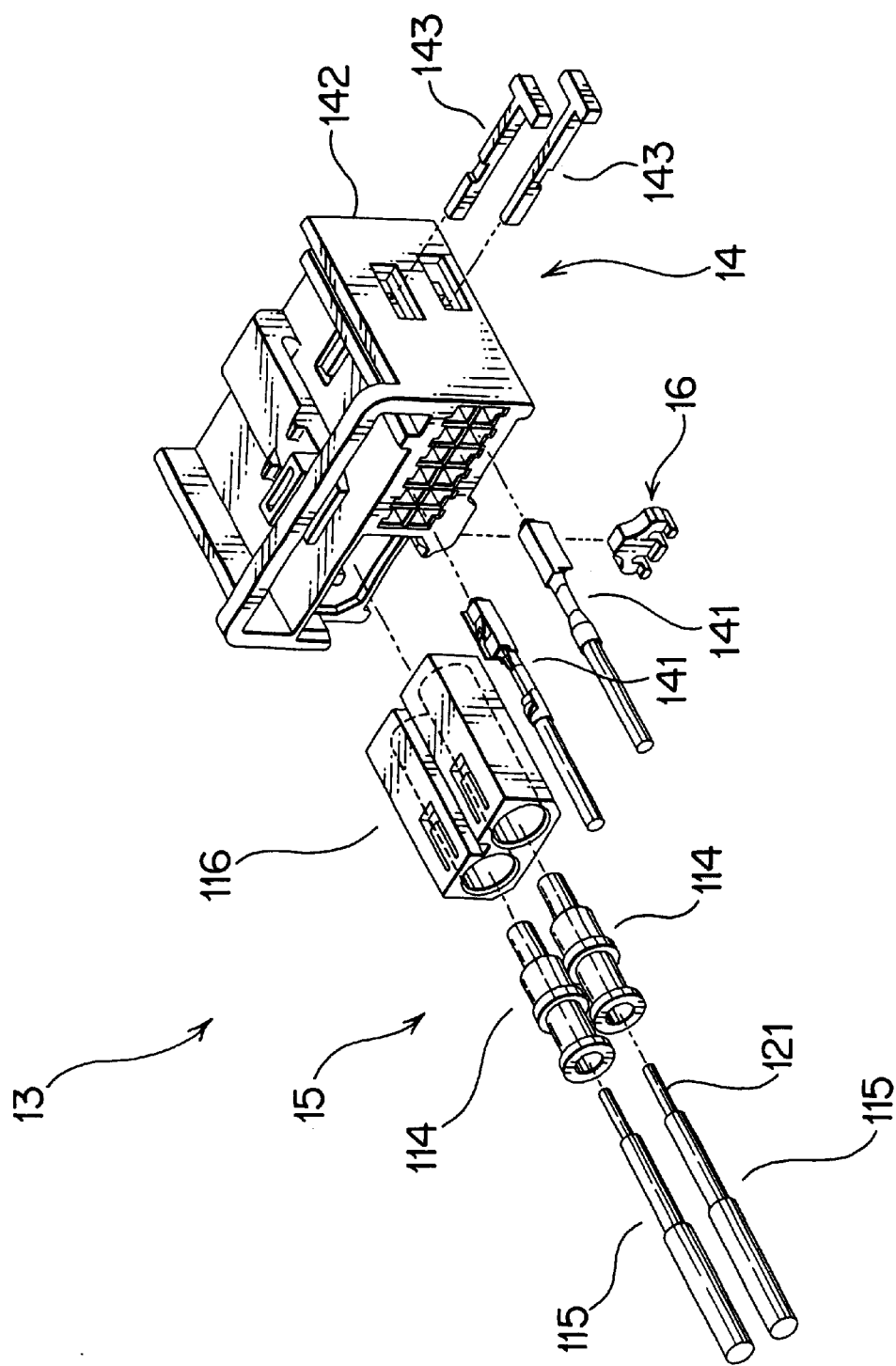
FIG. 3 is an exploded perspective view of a hybrid connector of a female type which mates with the male-type hybrid connector.

In FIG. 3, a hybrid connector 13 of a female type which mates with the hybrid connector 1 includes a female electrical connector 14, a female optical connector 15 assembled to the electrical connector 14, and a holder 16.

Each constituent element of the hybrid connector 1 will now be described in detail.

The PCB terminals 4 are known electrically-conductive male terminals and, as shown in FIG. 2, bent in L-like form to be located at one end in the electrical housing 5 and fixed at the other end to the not-shown printed circuit board. The PCB terminals 4, in the present embodiment, are placed in two, upper and lower tiers (six for each tier) in the electrical housing 5 and thus provided in two types having different lengths.

The electrical housing 5 is made of synthetic resin and, as shown in FIGS. 4 to 7, has a bottomed box-like shape opening at the front.

In other words, the electrical housing 5 has an upper wall 21 of rectangular shape when viewed from top, a bottom wall 22 parallel to the upper wall 21, a left and right side walls 23 and 24 contiguous to the upper and lower walls 21 and 22 at the lateral ends, and a rear wall 26 located at a side opposite the insertion open end 25 for the mating hybrid connector 13 (FIG. 3), which rear wall is contiguous to the upper, lower, left and right side walls 21, 22, 23 and 24.

At the inner side of the upper wall 21, there are formed an engagement dent 29 and guide grooves 30, 30 and 31, all extending along a fitting direction of the mating hybrid connector 13. The lower wall 22 is formed at its inner side with guide grooves 32, 32.

The engagement dent 29 extends straight at a center of the upper wall 21, from the open end 25 to an inner surface of the rear wall 26, and has a rectangular section under the upper wall 21. There are formed slits 33, 33 in the upper wall 21, which are in communication with the engagement dent 29 and extend from near the open end 25 to the rear wall 26.

The guide grooves 30, 30 extend straight at the lateral ends of the upper wall 21, from the open end 25 to the inner surface of the rear wall 26, and are laterally defined by the respective left and right side walls 23 and 24. The guide grooves 30, 30 have a rectangular section under the upper wall 21. The guide grooves 30, 30 have a depth equal to the engagement dent 29, but a width smaller than the latter.

The guide groove 31 is interposed between the engagement dent 29 and the guide groove 30 on the side of the right side wall 24, and extends straight from the open end 25 to the inner surface of the rear wall 26. The guide groove 31 also has a rectangular section under the upper wall 21 and has a depth roughly one half that of the guide grooves 30, 30 and a width equal to the latter.

The guide grooves 32, 32 are formed at the lateral ends of the lower wall 22, in opposition to the respective guide grooves 30, 30 and are laterally defined by the respective left and right side walls 23 and 24. The guide grooves 32, 32 have a rectangular section on the lower wall 22. The guide grooves 32, 32, like the guide grooves 30, 30 and 31 formed on the upper wall 21, extend straight from the open end 25 to the inner surface of the rear wall 26. The guide grooves 32, 32 have a depth smaller than the guide groove 31 and a width equal to the guide grooves 30, 30.

The left and right side walls 23 and 24 are provided with a mounting portion 36 with which to mount on the not-shown printed circuit board. The mounting portion 36 is roughly semicircular when viewed from top and has a height approximately one fourth the height of the left and right walls 23, 24. The mounting portion 36 has a lower surface flush with the lower wall 22 and a clip 37 at the lower surface for insertion through elastic deformation through and engagement with a corresponding hole formed in the not-shown printed circuit board.

The rear wall 26 is flat and perpendicular to the upper, lower, left and right side walls 21, 22, 23, 24 and has a PCB terminal mount section 40 and an optical connector mount section 41 juxtaposed to each other.

The PCB terminal mount section 40 is located toward the right side wall 24 and receives the PCB terminals 4 at the one end side in two tiers into the electrical housing 5. The PCB terminals 4 are pressed into at the terminal mount section 40 or insert-molded to form the electrical connector 2. The bends of the PCB terminals 4 in the upper tier are located remoter from the rear wall 26 than those of the PCB terminals 4 in the lower tier.

The optical connector mount section 41 is located toward the left side wall 23 and includes a holder portion 42 (FIG. 7) projecting from the rear wall 26 and an insertion opening 43 for the optical connector 3 (FIG. 2). The insertion opening 43 extends in the connector fitting direction through the holder portion 42 and the rear wall 26 to communicate to the inside of the electrical housing 5.

The holder portion 42 has a rectangular shape and projects perpendicularly to the rear wall 26. The holder portion 42 has its tip end projecting slightly farther than the bends of the PCB terminals 4 arranged in the lower tier in the PCB terminal mount section 40. The upper and lower walls of the holder portion 42 are each formed with two rectangular engagement holes 44 which communicate to the insertion opening 43.

The insertion opening 43 has a rectangular cross section and is formed with a taper surface 45 at the corner between the lower and left side walls 22 and 23, which taper surface extends longitudinally of the insertion opening 43. The taper surface 45 serves to prevent an erroneous fitting of the optical connector 3 (FIG. 2). The taper surface 45 may be located at other than the above-mentioned corner and may be replaced by a projection or groove as far as serving the above effect.

The FOT 6, as shown in FIG. 2, includes a molded portion 49 and a plurality of leads 48 extending from the molded portion. One of the leads 48 is mounted with a light emitting element (not shown). Wire bonding is also effected. The leads 48 are fixed (soldered) at the lower end to the not-shown printed circuit board. The not-shown light emitting element is disposed not at the center of the FOT 6 (or of the molded portion 49), but rather at a side toward the FOT 7. (The light emitting element may be located at the center, but, as will be described later, off-center arrangement toward the FOT 7 serves to make the hybrid connector 1 compact in size.) A light emitting diode (LED), for example, can be mentioned as the light emitting element of the FOT (light emitting element module) 6.

The molded portion 49 is molded to have a rectangular cross section from transparent resin material capable of transmitting light (for example, epoxy resin preferably having the same refractive index as that of a later-described plastic optical fiber 121). The leads 48 are embedded at the upper end in the molded portion 49. The molded portion 49 protects the light emitting element and the like from outside.

The FOT 7, as shown in FIG. 2, includes a molded portion 51 and a plurality of leads 50 extending from the molded portion. One of the leads 50 is mounted with a light receiving element (not shown). Wire bonding is also effected. The leads 50 are fixed (soldered) at the lower end to the not-shown printed circuit board. The not-shown light receiving element is disposed not at the center of the FOT 7 (or of the molded portion 51), but rather at a side toward the FOT 6. The light receiving element may be located at the center, but, as will be described later, off-center arrangement toward the FOT 6 serves to make the hybrid connector 1 compact in size. A photodiode (PD), for example, can be mentioned as the light receiving element of the FOT (light receiving element module) 7.

The molded portion 51, like the molded portion 49, is molded to have a rectangular cross section from transparent resin material capable of transmitting light (for example, epoxy resin preferably having the same refractive index as that of the later-described plastic optical fiber 121). The leads 50 are embedded at the upper end in the molded portion 51. The molded portion 51 protects the light receiving element and the like from outside.

In the present embodiment, because the not-shown light emitting element and the light receiving element are off-centered toward each other, it is also possible to have the optical fiber cables 115, 115 (FIG. 3) of the mating optical connector 15 located close to each other, resulting in the mating optical connector 15 (FIG. 3) itself made compact in size, which in turn makes the electrical housing 5 (FIG. 2) compact in size.

Figure 8:
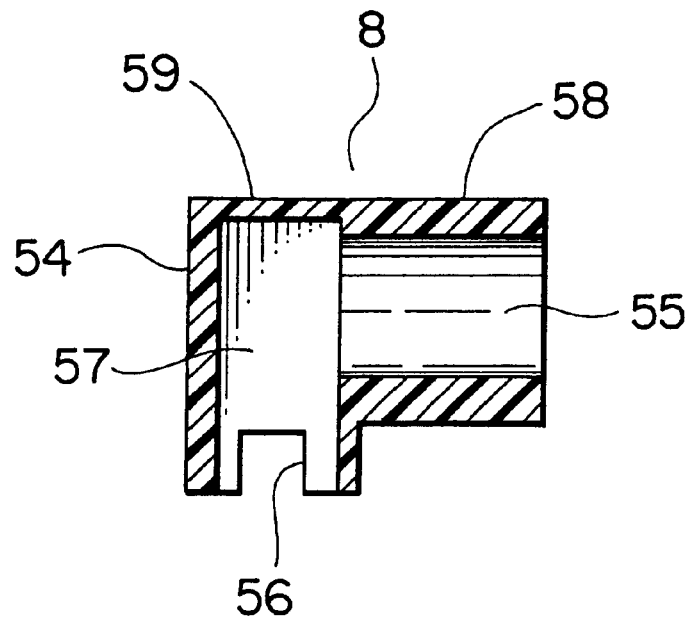
FIG. 8 is a sectional view of an FOT casing as in FIG. 2, which receives an FOT with a light-emitting element.

The FOT casing 8 is made of conductive synthetic resin material containing carbon fibers or the like (may also be made of insulating synthetic resin material, though) and, as shown in FIGS. 2 and 8, includes a case body 54 f or covering the molded portion 49 of the FOT 6 and a cylindrical portion 55 projecting from the case body 54.

The case body 54, as shown in FIG. 8, has a bottomed box-like shape. The molded portion 49 of the FOT 6 is pressingly inserted into the case body 54. The case body 54 has a rectangular cutout 56 at the insertion open end for the FOT 6, i.e., in the side wall 57 at the side remote from the cylindrical portion 55.

The cylindrical portion 55 is located at a position corresponding to the light emitting element (not shown) of the FOT 6, pressingly receives the related sleeve 11 (FIG. 2), and is formed with a flat surface 58 cut thereon which is flush with the upper wall 59 of the case body 54. The flat surface 58 is formed for placing the FOT 6 in position.

Figure 9:
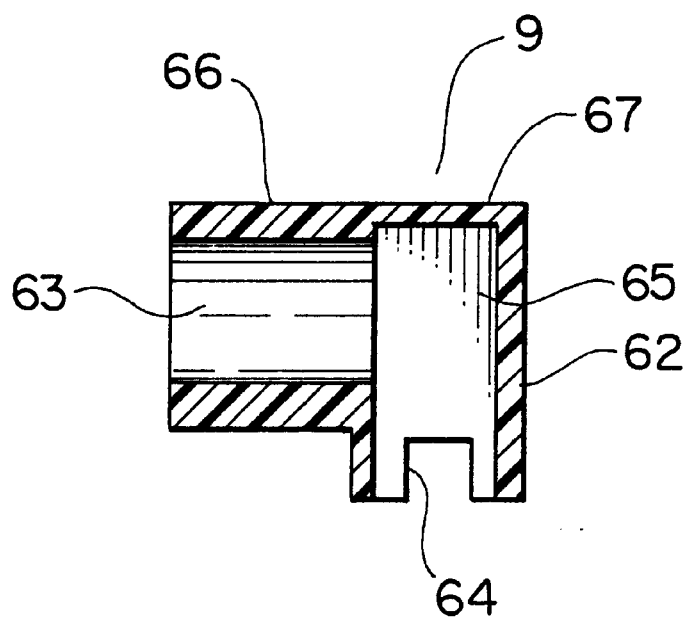
FIG. 9 is a sectional view of an FOT casing as in FIG. 2, which receives an FOT with a light-receiving element.

The FOT casing 9, like the FOT casing 8, is made of conductive synthetic resin material containing carbon fibers or the like (may also be made of insulating synthetic resin material, though) and, as shown in FIGS. 2 and 9, includes a case body 62 for covering the molded portion 51 of the FOT 7 and a cylindrical portion 63 projecting from the case body 62.

The case body 62 has a bottomed box-like shape, and the molded portion 51 of the FOT 7 is pressingly inserted into the case body 62. The case body 62, as shown in FIG. 9, has a rectangular cutout 64 at the insertion open end for the FOT 7, i.e., in the side wall 65 at the side remote from the cylindrical portion 63.

The cylindrical portion 63 is located at a position corresponding to the light receiving element (not shown) of the FOT 7, pressingly receives the related sleeve 11 (FIG. 2), and is formed with a flat surface 66 cut thereon which is flush with the upper wall 67 of the case body 62. The flat surface 66 is formed for placing the FOT 7 in position.

The shield casing 10 is made of a stamped conductive thin metal plate and, as shown in FIGS. 10 to 16, has two juxtaposed receiving sections 69, 69 (juxtaposed in a direction perpendicular to the connector fitting direction) partitioned by a partition wall 70, each having a U-shaped cutout 71, a convex portion 72, rectangular throughholes 73, 73 and a fixing portion 74 with which to fix to the not-shown printed circuit board. The receiving sections 69, 69 pressingly receive the respective FOT casings 8 and 9 (FIG. 2). The shield casing 10 may also be molded from conductive synthetic resin material containing carbon fibers or the like. The conductivity imparted to the shield casing 10 enhances shielding properties for the FOT 6 and FOT 7 (FIG. 1).

The cutouts 71, 71 are formed in the front wall 75 of the receiving sections 69, 69. Into the cutouts 71, 71 are pressingly inserted the respective cylindrical portions 55, 63 (FIG. 2). (For this purpose, the cutouts 71, 71 may have a width equal to an outer diameter of the cylindrical portions 55, 63.) If the cylindrical portions 55, 63 are received into the respective cutouts 71, 71, the positioning of the FOTs 6, 7 is completed. (It is difficult to size the receiving sections 69, 69 to the FOT casings 8, 9 without play, and thus the cutouts 71, 71 and the respective convex portions 72, 72 cooperate with each to compensate for the play and properly position the FOTs 6, 7, so as to make an improvement in the transmission efficiency.)

The convex portions 72, 72 have an oval shape and are formed by striking to project on the rear wall 76 of the receiving sections 69, 69, at positions corresponding to the cutouts 71, 71. Each convex portion 72 is provided with a circumferential taper.

The throughholes 73, 73 are formed in the side wall 77 of each receiving section 69 opposed to the partition wall 70. The shield casing 10 is fixed in the optical housing 12 (FIG. 2) through the throughholes 73, 73.

The fixing portion 74 extends from each side wall 77 and serves not only to fix the shield casing 10 to the not-shown printed circuit board, but also as a ground terminal.

Figure 10:
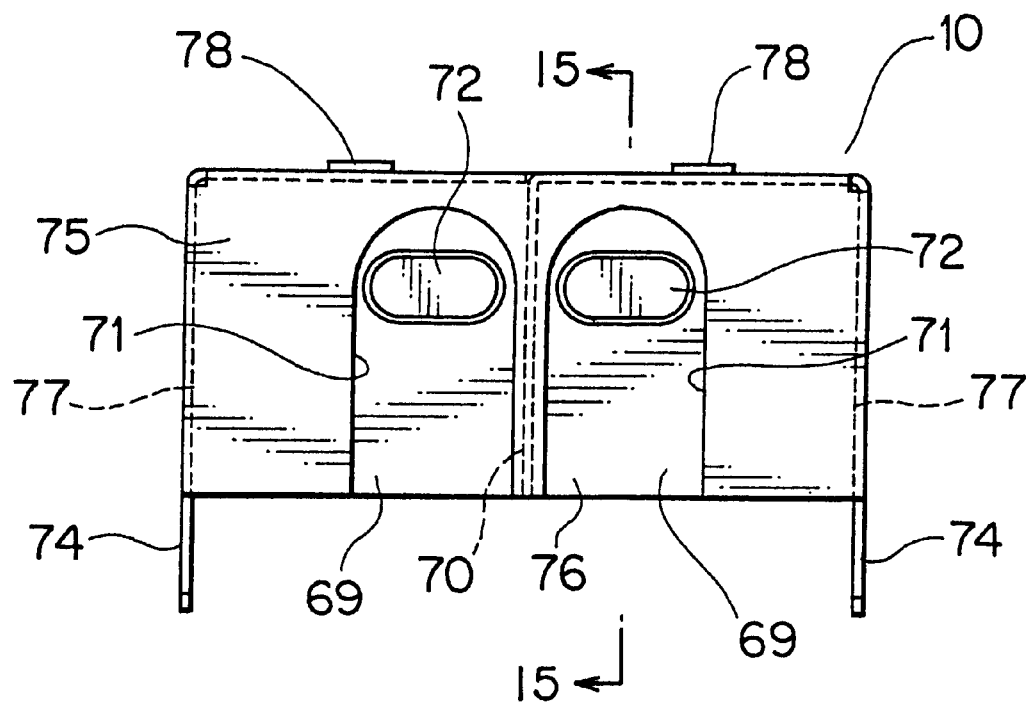
FIG. 10 is a front view of a shield casing as in FIG. 2.
Figure 11:
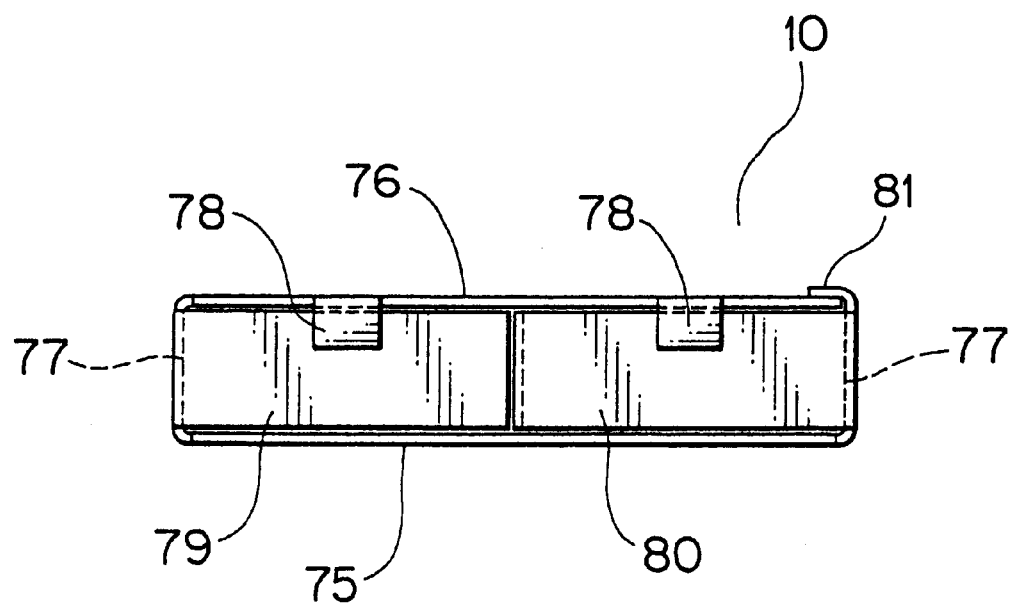
FIG. 11 is a plan view of the shield casing.
Figure 12:
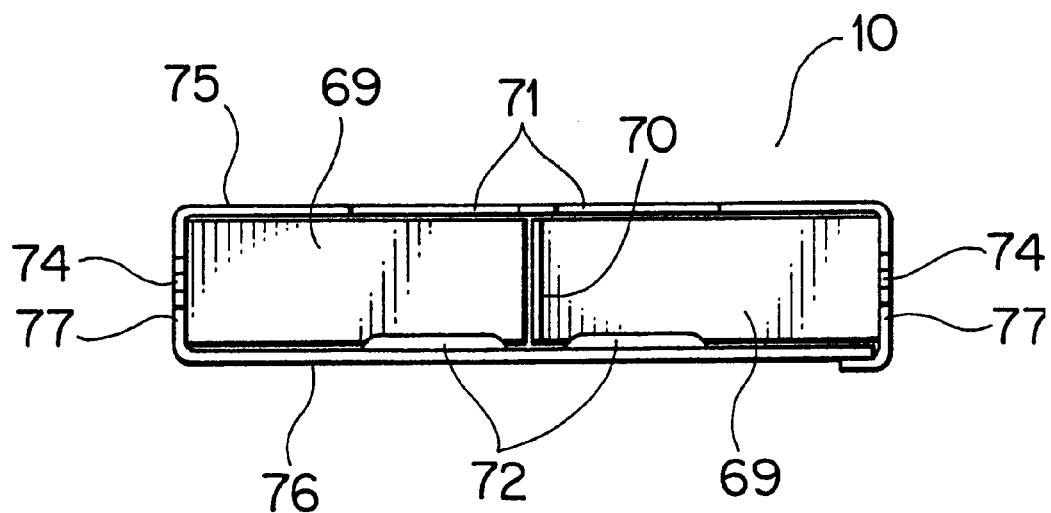
FIG. 12 is a bottom view of the shield casing.
Figure 13:
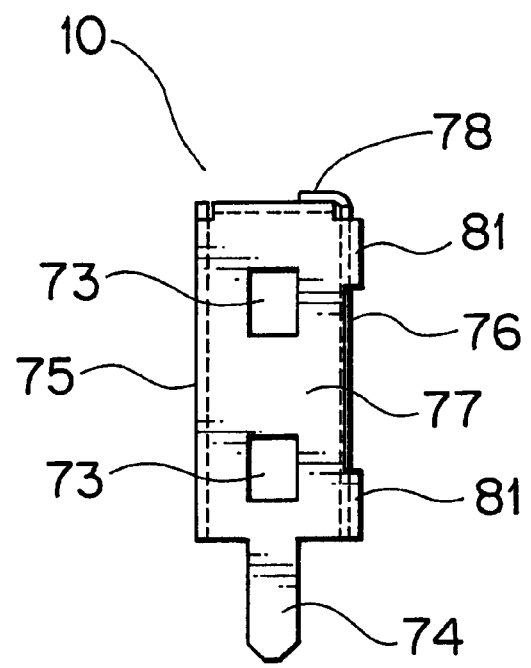
FIG. 13 is a right side view of the shield casing.
Figure 14:
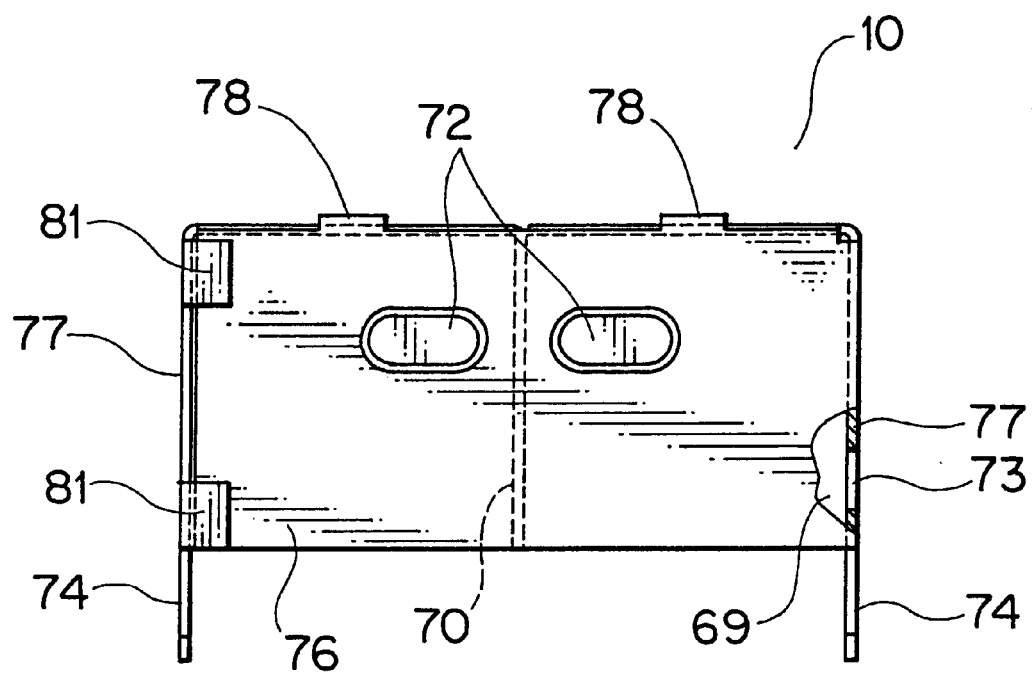
FIG. 14 is a rear view of the shield casing.
Figure 15:
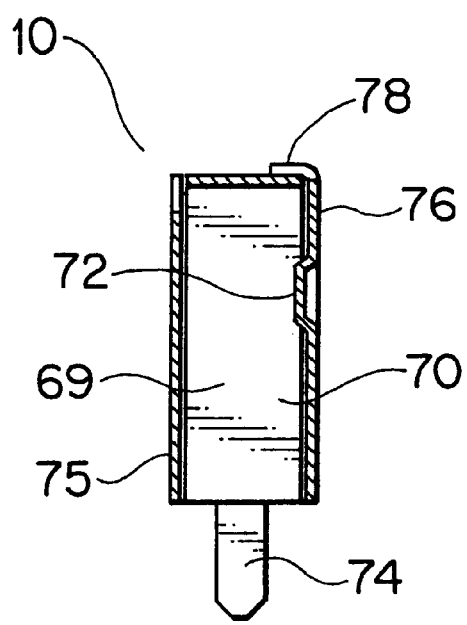
FIG. 15 is a sectional view taken along the line 15—15 of FIG. 10.
Figure 16:
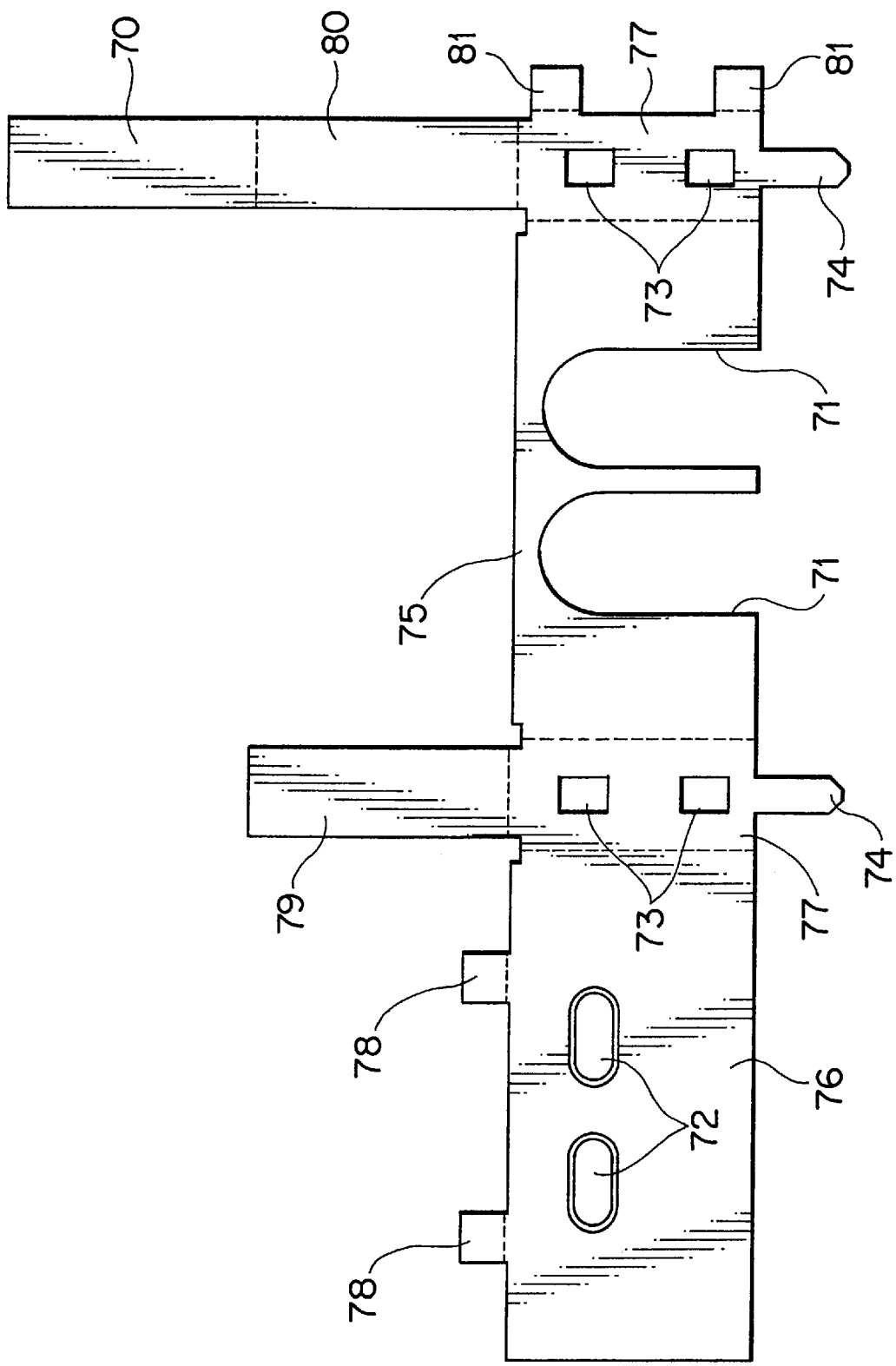
FIG. 16 is a developed view of the shield casing.
Figure 19:
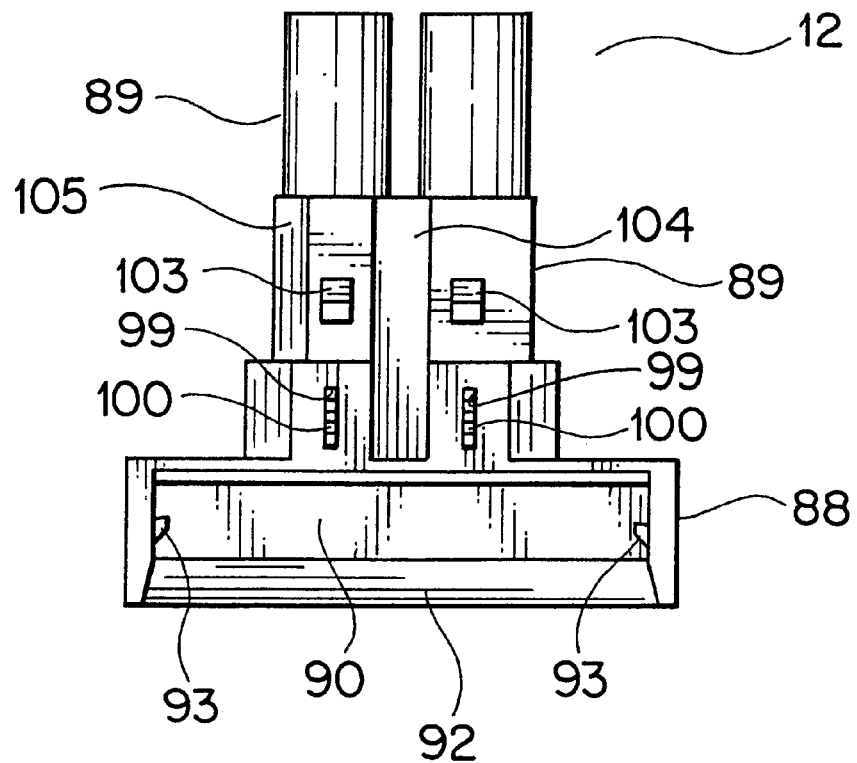
FIG. 19 is a bottom view of the optical housing.
Figure 20:
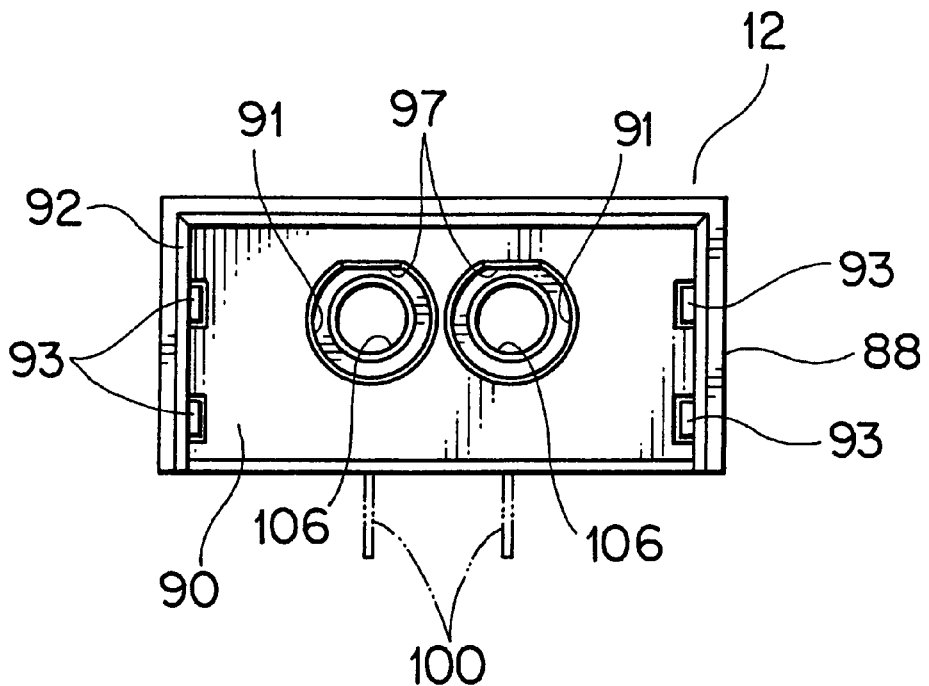
FIG. 20 is a rear view of the optical housing.

To elaborate on the shield casing 10 with reference to FIG. 16, which shows the shield casing in an unfolded condition with dotted lines indicative of where to fold, the rear wall 76 is formed with the convex portions 72, 72 and holding flaps 78, 78 of short length and contiguous to the upper end of the rear wall 76. The rear wall 76 is provided at the right side with the side wall 77 which has the vertically arranged throughholes 73, 73. Extending at the upper end of the side wall 77 is a lid 79 for the left side receiving section 69 (FIG. 10). The side wall 77 is formed at the lower end with the left side fixing portion 74.

Provided at the right side of the side wall 77 is the front wall 75 which has the cutouts 71, 71. The cutouts 71, 71 extend from the lower end of the front wall 75. The front wall 75 is provided at the right side with the side wall 77 which has the vertically arranged throughholes 73, 73. Extending at the upper end of the side wall 77 are a lid 80 for the right side receiving section 69 (FIG. 10) and the partition wall 70. The side wall 77 is formed at the lower end with the right side fixing portion 74 and at the right side with holding flaps 81, 81 of the same size as the holding flaps 78. 78 of the rear wall 76.

Each sleeve 11, as shown in FIG. 2, includes an optical fiber 84 (preferably having the same refractive index as that of the later-described optical fiber 121) which is made up of a core and a cladding, and a cylindrical holder 85 around the optical fiber.

The sleeves 11, 11 may be provided by cutting the later-described optical fiber cables 115, 115 (FIG. 3) in predetermined lengths and grinding them at their both ends.

The optical housing 12 is made of conductive synthetic resin material containing carbon fibers or the like and, as shown in FIGS. 17 to 22, includes an FOT receiving section 88 and sleeve receiving sections 89, 89 integrally projecting from the FOT receiving section 88.

Figure 21:
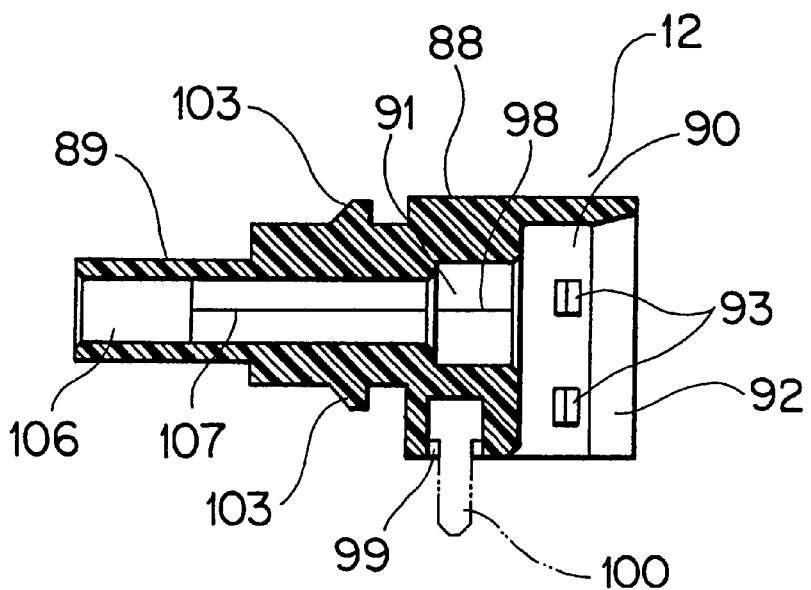
FIG. 21 is a sectional view taken along the line 21—21 of FIG. 17.
Figure 22:
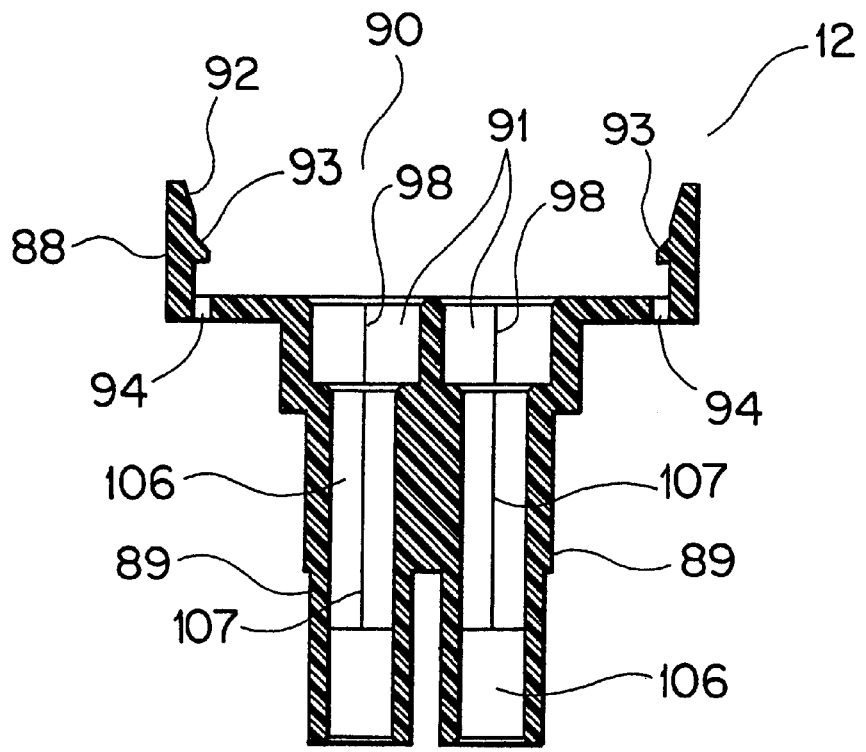
FIG. 22 is a sectional view taken along the line 22—22 of FIG. 17.
Figure 23:
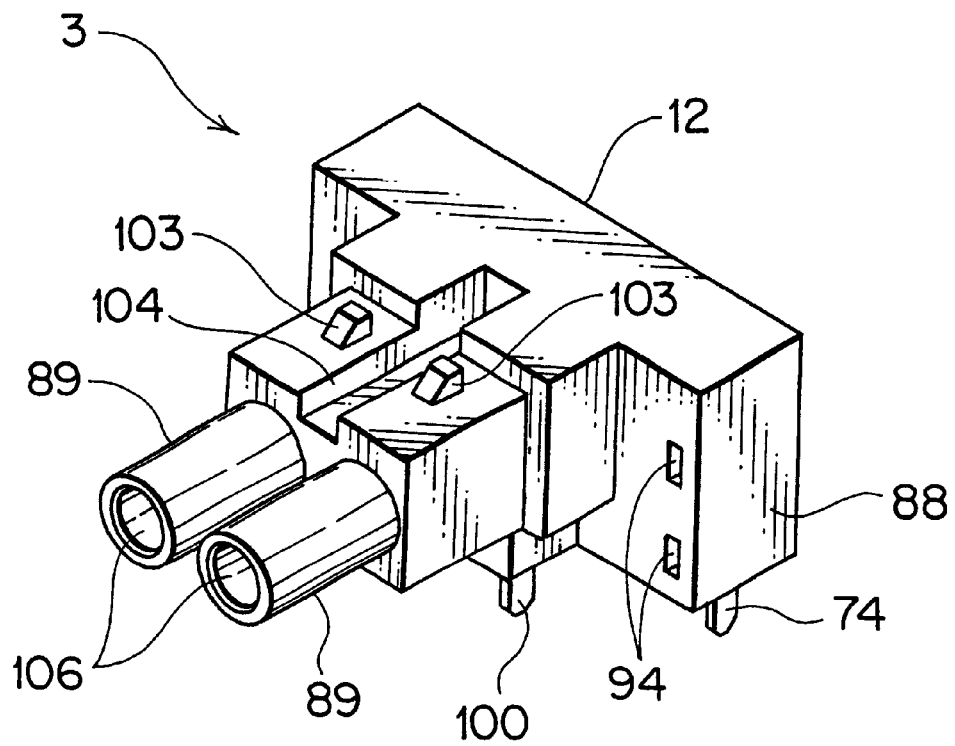
FIG. 23 is a perspective view of an optical connector as in FIG. 2.
Figure 24:
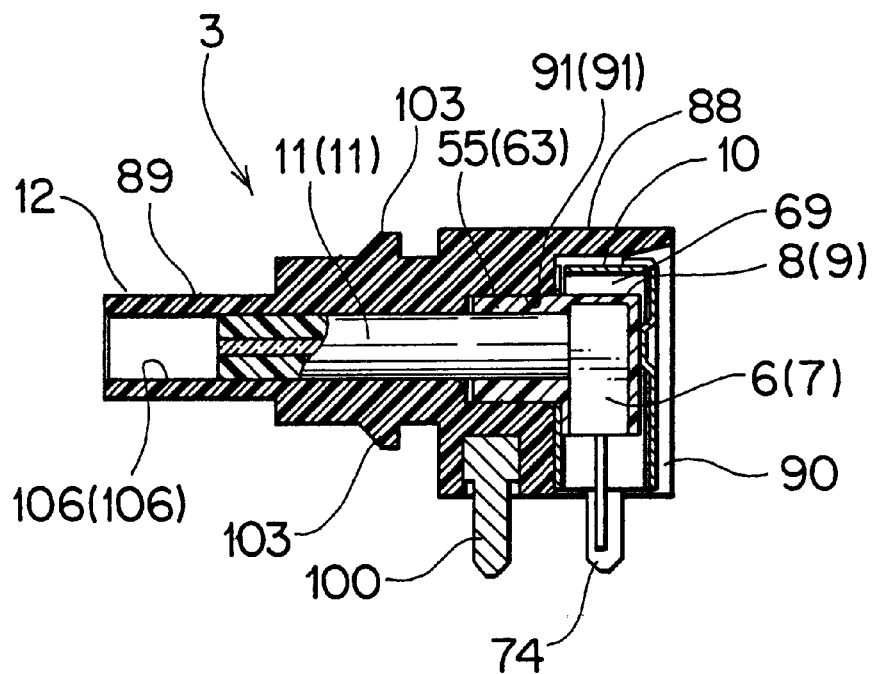
FIG. 24 is a vertical sectional view of the optical connector of FIG. 23.
Figure 25:
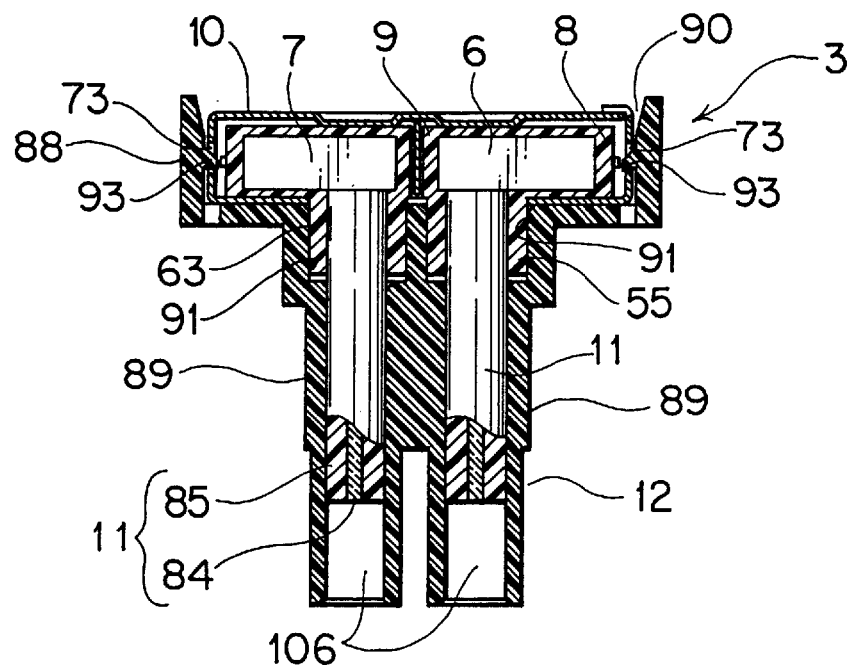
FIG. 25 is a horizontal sectional view of the optical connector of FIG. 23.

The FOT receiving section 88, as best seen in FIGS. 21 and 22, has a body receiving portion 90 for receiving the case bodies 54, 62 of the FOT casings 8, 9 and receiving portions 91, 91, each contiguous to the body receiving portion 90 in a convex manner, for receiving the cylindrical portions 55, 63 of the FOT casings 8, 9.

The body receiving portion 90 of the FOT receiving section 88 opens downwardly (at a side opposed to the not-shown printed circuit board) and rearwardly, is provided at the rear open end with taper surfaces 92, and is formed to receive the shield casing 10 (FIG. 2) so that its rear wall 76 (FIG. 14) does not protrude from the rear open end. The FOT receiving section 88 has claw-like locking projections 93, 93 formed on its left side and right side walls defining the body receiving portion 90, which lockingly engage in the throughholes 73, 73 (FIG. 2) of the shield casing 10. Each locking projection 93 is provided at a side thereof toward the rear open end with a taper. Denoted 94, 94 are mold-removing holes for forming the locking projections 93, 93.

The receiving portions 91, 91 are bores contiguous to the body receiving portion 90, which correspond in shape to the outer dimensions of the cylindrical portions 55 and 63 (FIG. 2). Each receiving portion 91 is formed with a flat surface 97 corresponding to the flat surface 58, 66 (FIG. 2) of the respective cylindrical portion 55, 63 and with a plurality of minute pressing projections 98 for holding the respective cylindrical portion 55, 63 (FIG. 2). A taper is formed between each receiving portion 91 and the body receiving portion 90.

The lower wall of the FOT receiving section 88 is formed at positions below the receiving portions 91, 91 with recesses 99, 99 for fitting therein of ground terminals 100, 100. The ground terminals 100, 100 are stamped from a conductive thin metal plate to have a shape equal to the fixing portions 74 (FIG. 2) and are fixed to the not-shown printed circuit board.

The sleeve receiving sections 89, 89 each consists of a portion of rectangular outside shape contiguous to the FOT receiving section 88 and a portion of cylindrical outside shape extending from the rectangular portion.

The rectangular portion of each sleeve receiving section 89 has a claw-like locking projection 103 on its upper and lower walls, the locking projection having a taper at a side toward the cylindrical portion. There is formed a groove 104 between the locking projections 103, 103 and thus between the rectangular portions. One of the rectangular portions is provided at a lower corner thereof with a taper surface 105 (FIG. 27) which cooperates with the taper surface 45 (FIG. 5) of the electrical housing 5 to prevent an erroneous assembly as mentioned above.

Each sleeve receiving section 89 is internally formed with a bore of circular cross section in communication with the related receiving portion 91, into which the sleeve 11 (FIG. 2) is pressingly inserted from the receiving portion 91 side. There is formed a taper at the junction between the bore 106 and the related receiving portion 91. The bore 106 is formed with a plurality of minute pressing projections 107 for holding the sleeve 11 (FIG. 2).

With the construction as described above, the electrical connector 2 and the optical connector 3, which are in advance assembled in separate processes, are assembled together to provide the hybrid connector 1. The assembly of the optical connector 3 will now be described with reference to FIG. 2 and FIGS. 23 to 25, the assembly of the electrical connector 2 being already described hereinabove.

First, the FOT 6 is received in the case body 54 of the FOT casing 8, and the FOT 7 in the case body 62 of the FOT casing 9 such that their not-shown light emitting element and light receiving element are located behind the cylindrical portions 55, 63.

The sleeve 11 is then pressed at one end into each cylindrical portion 55, 63 (which may be effected after the shield casing 10 is fitted over the FOT casings 8, 9, though). Thereafter, the FOT casing 8 and the FOT casing 9 are juxtaposed and fitted into the receiving sections 69, 69 of the shield casing 10 so that the cylindrical portions 55, 63 project out through the respective cutouts 71, 71 of the shield casing 10, by which the FOT casings 8 and 9 are set in position, thereby in turn to locate the FOTs 6 and 7 in position.

The thus obtained assembly is then fitted in the optical housing 12, at which time the locking projections 93, 93 of the body receiving portion 90 engage in the corresponding throughholes 73, 73 of the shield casing 10 (FIG. 25) to lock together the obtained assembly and the optical housing 12. By the above, the sleeves 11, 11 are received in the respective bores 106, 106, with the cylindrical portions 55, 63 received in the receiving portions 91, 91. In this instance, the flat surfaces 58, 66 on the cylindrical portions 55, 63 cooperate with the respective flat surfaces 97, 97 (FIG. 20) of the receiving portions 91, 91 to set the FOTs 6 and 7 in position. The optical connector 3 is thus assembled.

Figure 26:
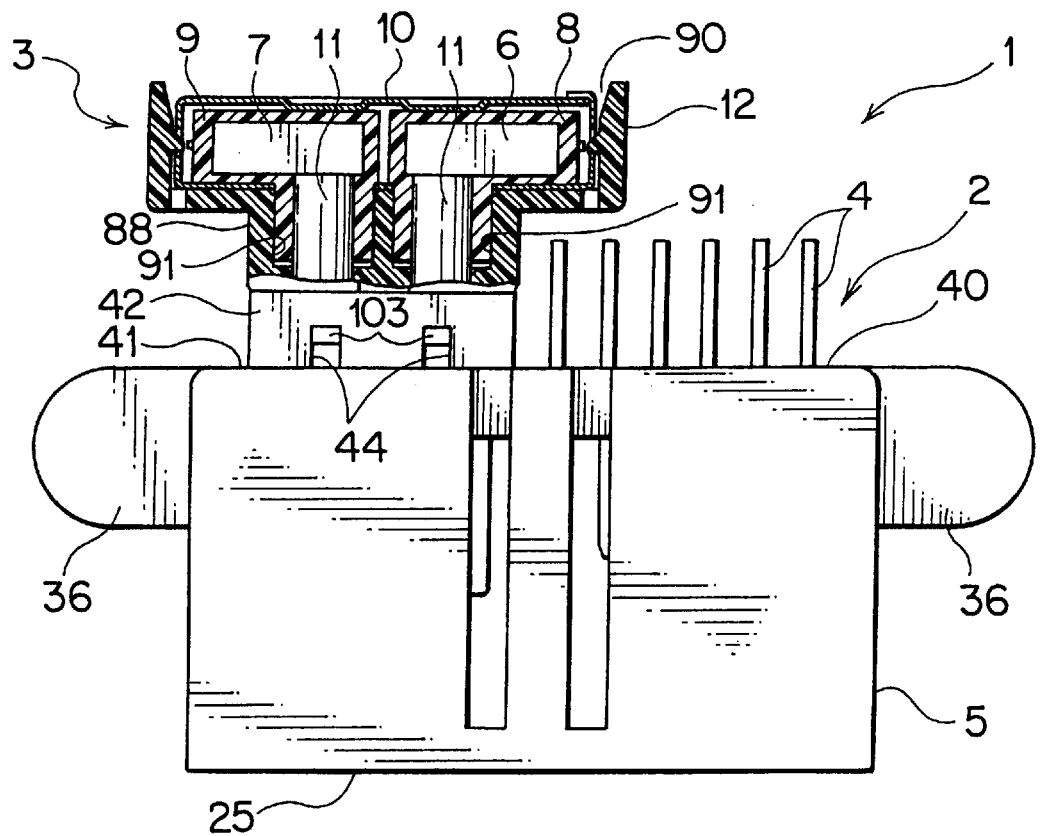
FIG. 26 is a partially sectional plan view of the hybrid connector.
Figure 27:
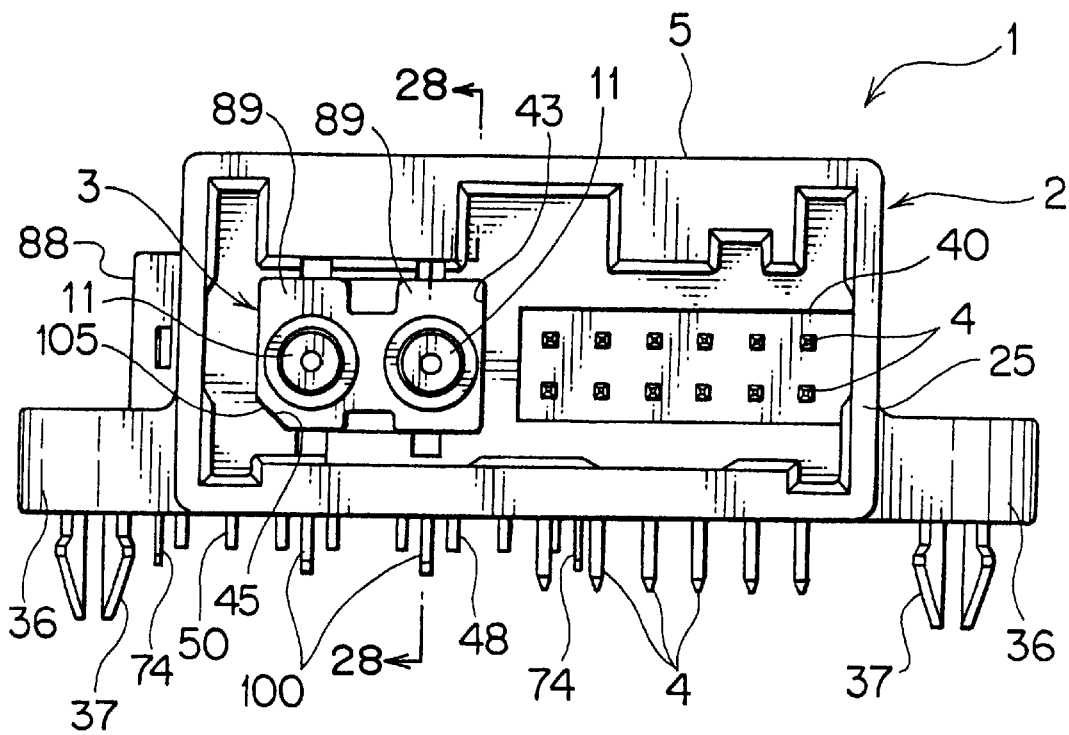
FIG. 27 is a front view of the hybrid connector.
Figure 28:
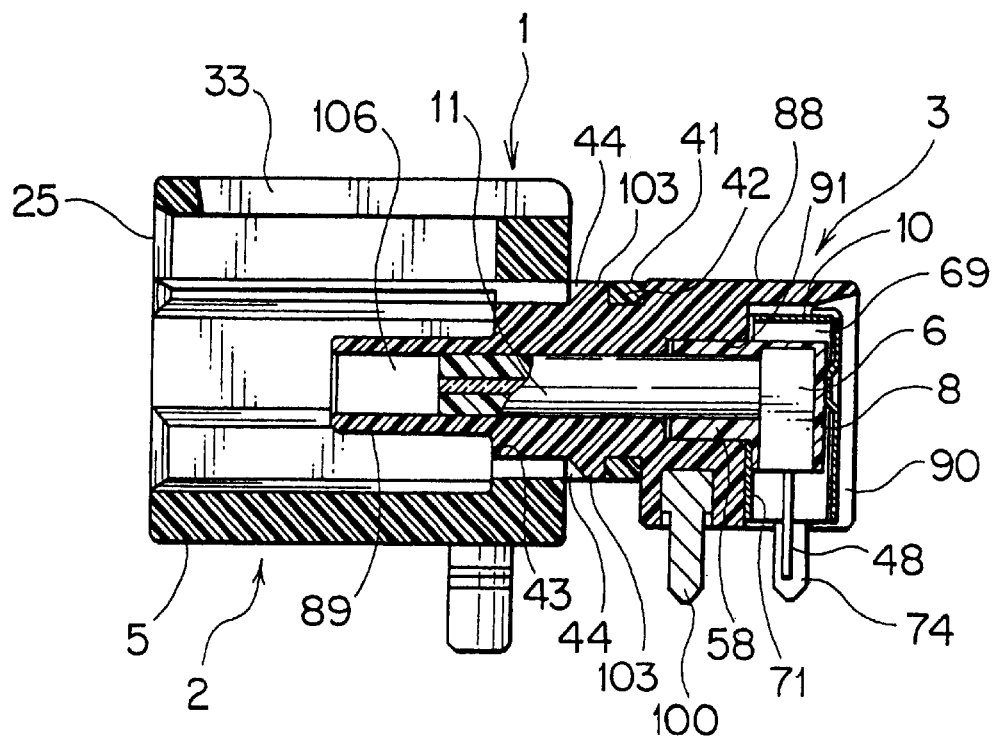
FIG. 28 is a sectional view taken along the line 28—28 of FIG. 27.

Thereafter, as shown in FIGS. 26 to 28, the optical connector 3 is mounted in the optical connector mount section 41 of the electrical connector 2 to assemble the hybrid connector 1.

Figure 4:
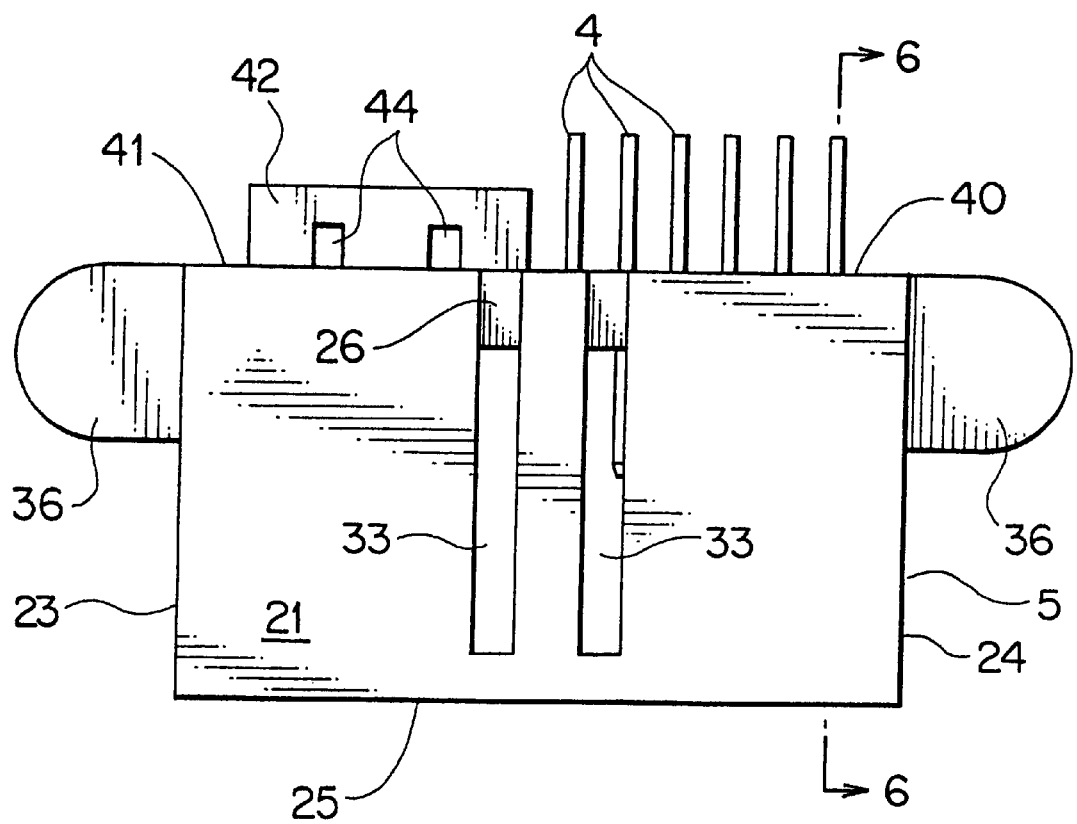
FIG. 4 is a plan view of an electrical connector in FIG. 1.
Figure 5:
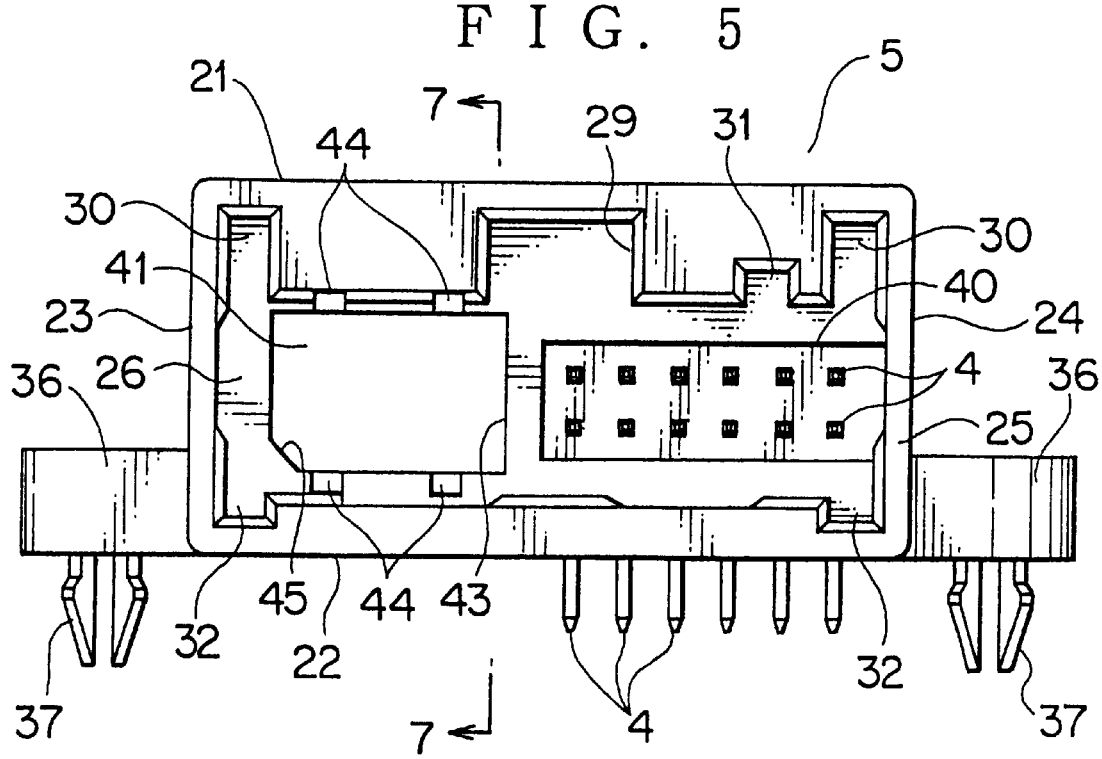
FIG. 5 is a front view of the electrical connector.
Figure 6:
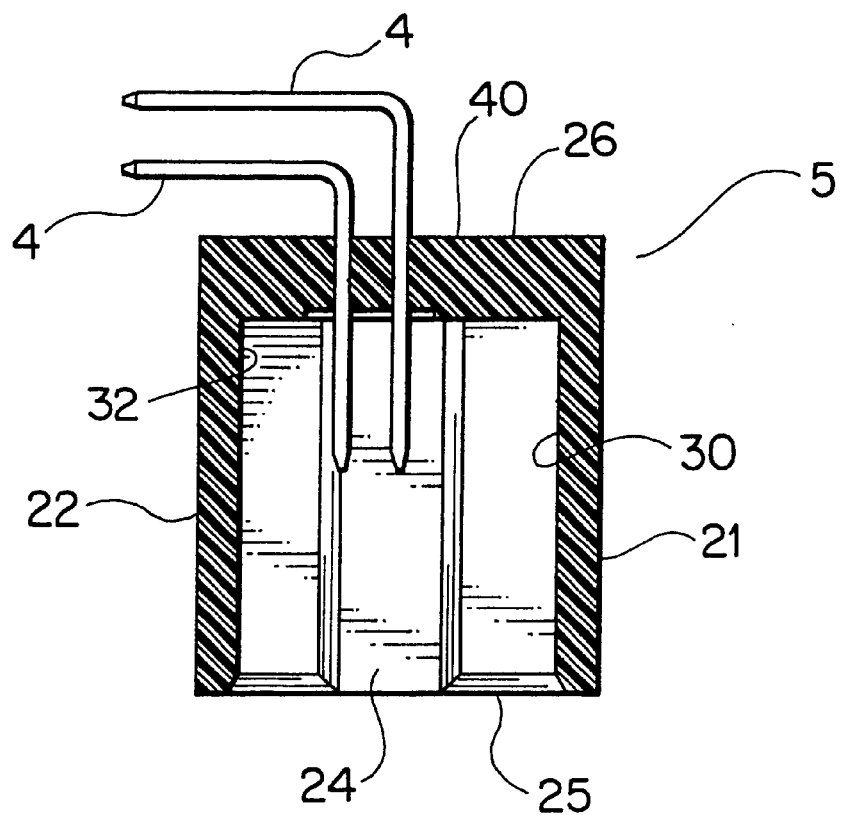
FIG. 6 is a sectional view taken along the lines 6—6 of FIG. 4.
Figure 7:
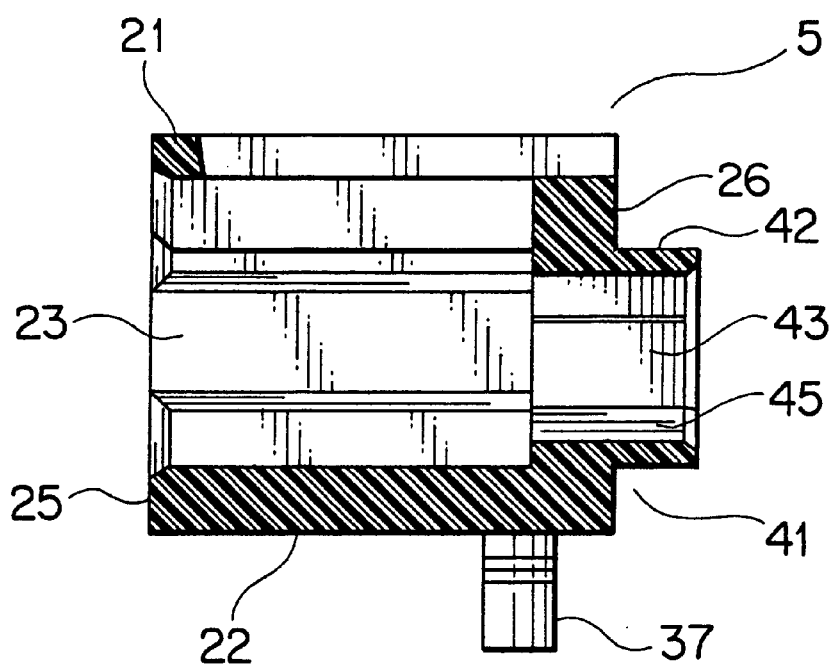
FIG. 7 is a sectional view taken along the line 7—7 of FIG. 5.

In other words, the sleeve receiving sections 89, 89 of the optical connector 3 are inserted into the insertion opening 43 of the optical connector mount section 41 until its four locking projections 103 lockingly engage in the four engagement holes 44 of the electrical housing 5 (FIGS. 4 and 28). A series of assembling operations are thus completed.

With the construction as mentioned above, the FOT receiving section 88 of the optical connector 3 comes into contact with the tip end of the holder portion 42 of the optical connector mount section 41 to restrict the movement of the optical connector 3 in the connector fitting direction.

Due to the holder portion 42 and the receiving portions 91, 91 which abut end-to-end against each other, the body receiving portion 90 of the FOT receiving section 88 is located farther from the electrical housing 5 than the bends of the PCB terminals such that it overhangs a part of the bends with a spacing therebetween (in the present embodiment, the body receiving portion 90 overhangs two of the bends of the PCB terminals 4), thereby to make the hybrid connector 1 compact in size or width by the length by which the body receiving portion 90 overhangs the PCB terminals 4.

Suppose the FOT receiving section 88 of the optical connector 3 and the PCB terminals 4 are juxtaposed in the same plane to provide the hybrid connector 1, the size of the resulting hybrid connector 1 in the direction perpendicular to the connector fitting direction will become upsized by the overhanging length.

Further, the FOT receiving section 88 (the body receiving portion 90) which overhangs the PCB terminals 4 protects the same, so as to facilitate control in the production of hybrid connectors and serve to improve production efficiency.

The thus assembled hybrid connector 1 of a male type is coupled to the mating hybrid connector 13 of a female type as shown in FIG. 3, which, as mentioned hereinabove, includes the electrical connector 14 and the optical connector 15 mounted in the electrical connector. The electrical connector 14 and the optical connector 15 mate with the electrical connector 2 and the optical connector 3, respectively, when the hybrid connectors 1 and 13 are coupled together. In FIG. 3, denoted 142 is an electrical housing, 141 are electrical terminals, and 143 are spacers for locking the electrical terminals 141 in place in the electrical connector 14. Denoted 116 is an optical adapter which receives therein the ferrules 114 which in turn receive respective optical fiber cables 115 with the POF 121, which optical adapter 116 is mounted in the electrical housing 142 to constitute the optical connector 15. The holder 16 is fitted from below into the electrical housing 142 and through the optical adapter 116 to lock the optical adapter 116 and the ferrules 114 in place.

Description will now be made of another embodiment of a hybrid connector according to this invention with reference to FIG. 29.

Figure 29:
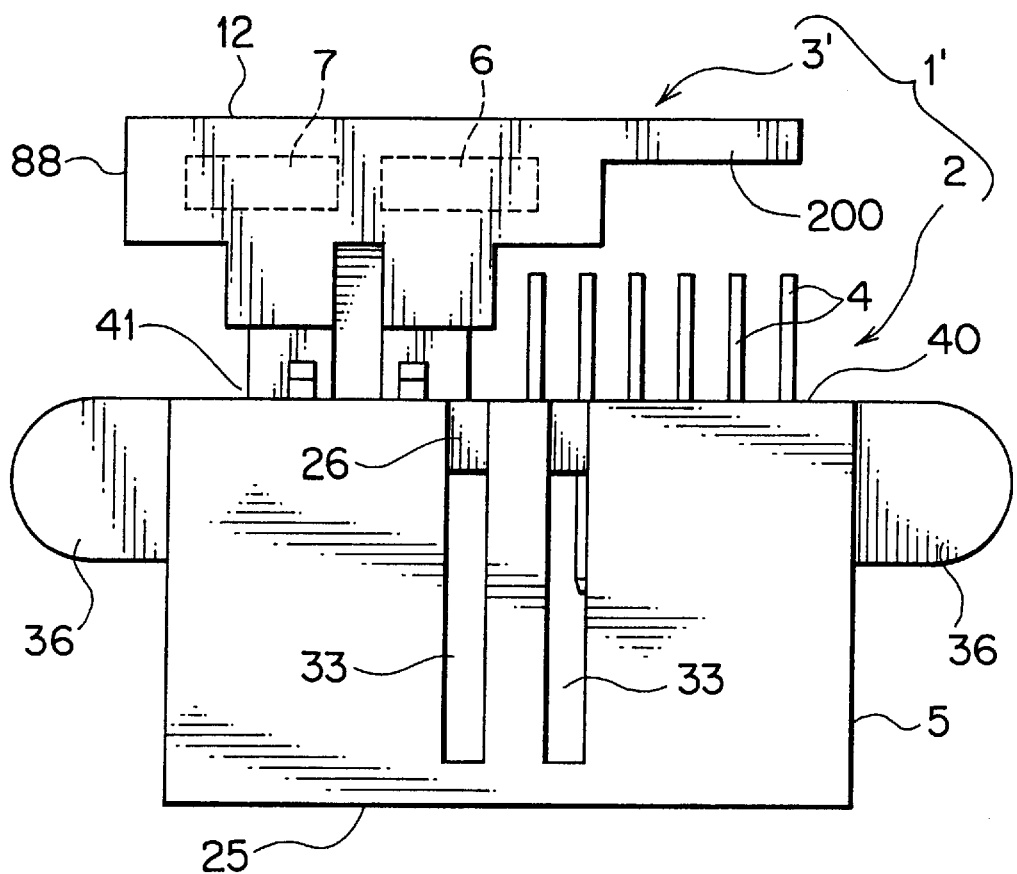
FIG. 29 is a plan view of a hybrid connector according to another embodiment of this invention.

In FIG. 29, a hybrid connector 1' of a male type includes the electrical connector 2 and a male optical connector 3' assembled to the electrical connector 2. The electrical connector 2 is the same as that described in the preceding embodiment and its description will be omitted.

The optical connector 3' differs from the optical connector 3 (FIGS. 1 and 2) in that it has an additional terminal protector 200.

Figure 30:
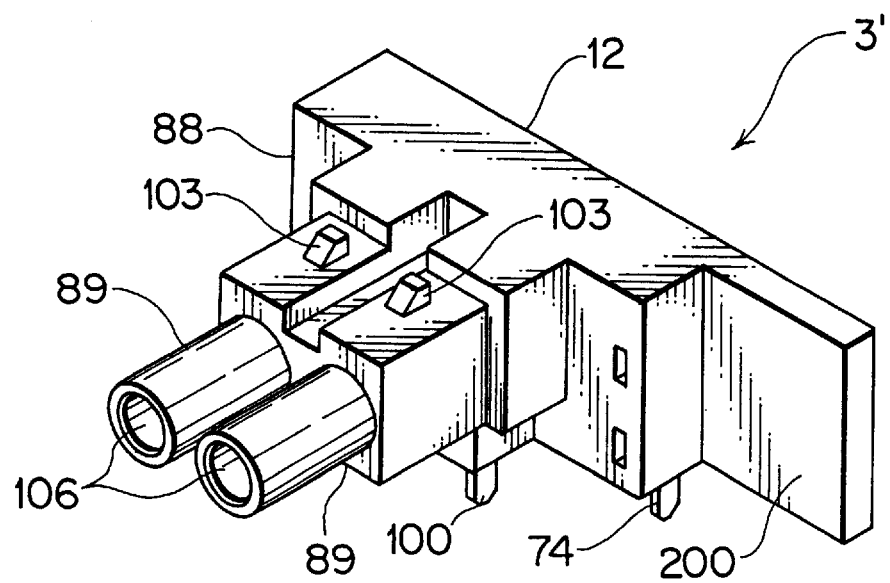
FIG. 30 is a perspective view of an optical connector as in FIG. 29.

The terminal protector 200, as shown in FIGS. 29 and 30, includes a rectangular plate or piece extending from the optical housing 102 at the FOT receiving section 88, in a direction in which the PCB terminal mount section 40 and the optical connector mount section 41 are juxtaposed. The terminal protector 200 overhangs the bends of the PCB terminals 4, with a spacing therebetween. The terminal protector 200 makes an improvement over the hybrid connector 1 (FIGS. 1 and 2), in the effect of protecting the terminals.

The terminal protector 200 is not limited to have the rectangular plate shape, but may be provided in other forms insofar as capable of protecting the PCB terminals 4.

Yet another embodiment of a hybrid connector according to this invention will be described with reference to FIG. 31 in which parts or elements identical with those of the previously described hybrid connector 1 are given like reference numerals and their description will be omitted.

Figure 31:
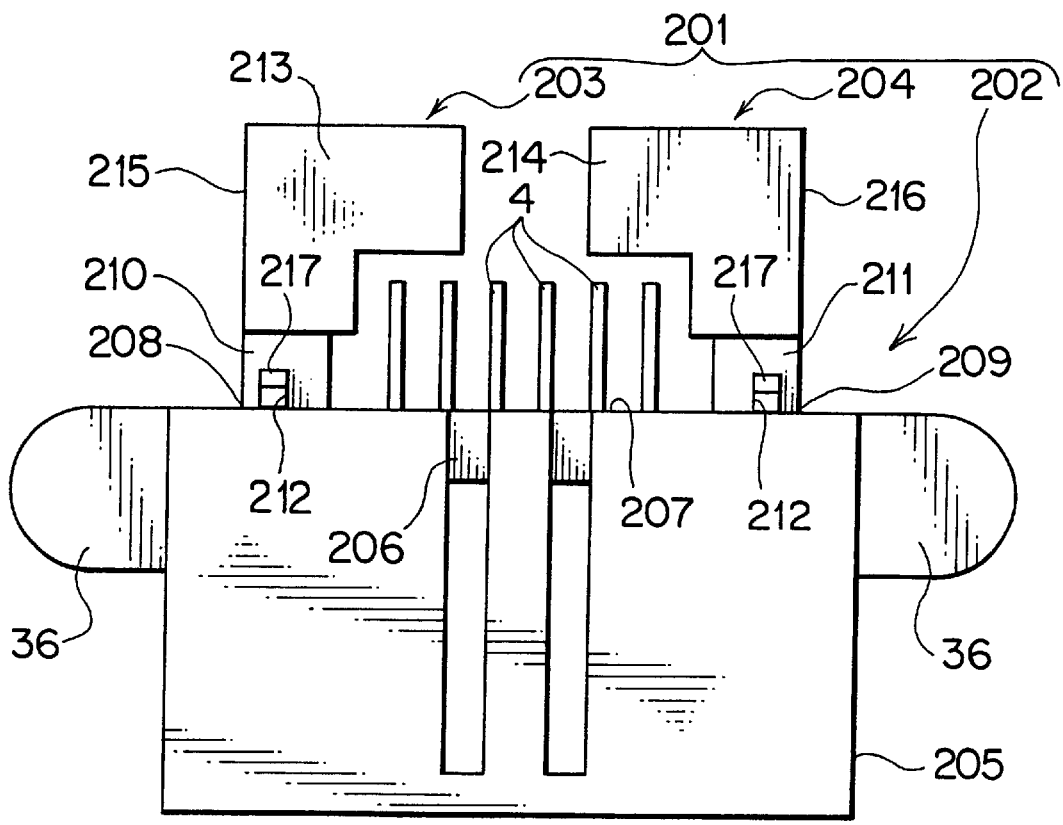
FIG. 31 is a plan view of a hybrid connector according to yet another embodiment of this invention.
Figure 32:
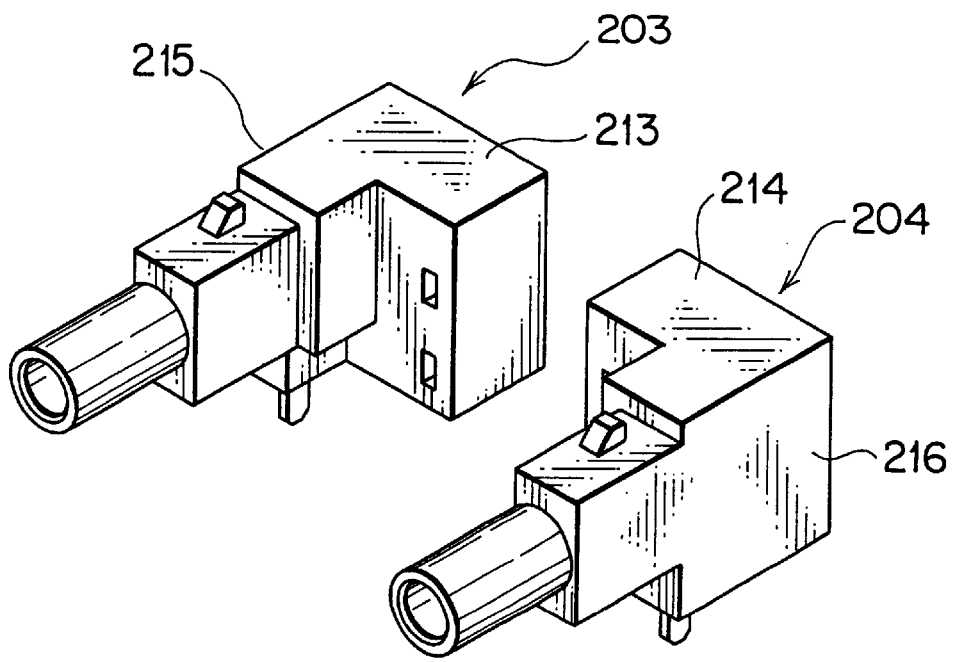
FIG. 32 is a perspective view of an optical connector as in FIG. 31.

In FIG. 31, a hybrid connector 201 of a male type includes an electrical connector 202 and male optical connectors 203, 204 assembled to the electrical connector 202.

The electrical connector 202 includes a bottomed box-like electrical housing 205 and a plurality of PCB terminals 4, a total of 12 terminals arranged in two tiers. Located at the left side and right side walls is the mounting portion 36. The rear wall 206 is provided at the center with a PCB terminal mount section 207, on the left side of the mount section 207 with an optical connector mount section 207, and on the right side of the mount section 207 with an optical connector mount section 209.

The plurality of PCB terminals 4 are inserted in the electrical housing 205 at the PCB terminal mount section 207. Holders 210, 211 project at the respective optical connector mount sections 208, 209, with the aid of which the optical connectors 203, 204 are assembled to the electrical housing 205. Each holder 210, 211 is formed with an engagement hole 212.

The optical connectors 203, 204 have a shape as if obtained by dividing the optical connector 3 (FIG. 23) at its center axis. The optical connectors 203, 204 internally have their respective FOTs (light emitting element module and light receiving element module), with the not-shown light emitting element and light receiving element located off-center inside the FOTs toward away from the PCB terminals 4 when the hybrid connector 201 is assembled.

If the optical connectors 203, 204 are assembled through the related holders 210, 211 to the electrical connector 202 at the respective sections 208, 209, the optical connectors 203, 204 at their FOT receiving sections 213, 214 overhang or overlie the bends of the PCB terminals 4, with a spacing therebetween. Denoted 215, 216 are optical housings. Denoted 217 are locking projections which lockingly engage in the respective engagement holes 212.

With the optical connectors 203, 204 as described above which are divided from each other, an increase is made in the length by which to overhang the PCB terminals 4, thereby serving to downsize the hybrid connector and better protect the PCB terminals 4.

While in the above examples, this invention is described in conjunction with a connector for use with a two core type optical fiber bidirectional communication system, this invention is also applicable to a connector for use with a one core type optical fiber bidirectional communication system.

Further, the FOT 6 and the FOT 7, if their molded portions 49, 51 are formed to have the functions of the FOT casing 8 and the FOT casing 9, can be directly received and retained in the related receiving sections 69, 69 of the shield casing 10.

Having now fully described the invention, it will be apparent to one of ordinary skill in the art that many changes and modifications can be made thereto without departing from the spirit and scope of the invention as set forth herein.

What is claimed is:

1. A hybrid connector having an electrical connector and an optical connector assembled to said electrical connector, said electrical connector comprising:
    an electrical housing having an open end through which to fit to a mating hybrid connector and a wall at an end thereof opposite said open end, said wall having a terminal mount section and an optical connector mount section juxtaposed to each other in a direction perpendicular to a connector fitting direction of said hybrid connector and said mating hybrid connector, and
    terminals bent L-shaped which are inserted at one end through said terminal mount section into said electrical housing to have bends thereof located outside said terminal mount section, and said optical connector comprising:
        an optical housing with an optical element module receiving section;
        a light emitting element module having a light emitting element; and
        a light receiving element module having a light receiving element, said light emitting element module and said light receiving element module being accommodated in said optical element module receiving section of said optical housing,
        wherein when said optical connector is assembled through said optical connector mount section to said electrical connector, said optical housing overlies at said optical element module receiving section at least at one of said bends of said terminals, with a spacing therebetween.

2. The hybrid connector according to claim 1, wherein said light emitting element is located off-center in said light emitting element module toward said light receiving element module, and said light receiving element is located off-center in said light receiving element module toward said light emitting element module.

3. The hybrid connector according to claim 1, wherein said optical housing has at said optical element module receiving section a terminal protector extending in said direction perpendicular to said connector fitting direction to overlie said bends of said terminals.

4. A hybrid connector having an electrical connector and a transmitting and receiving optical connectors assembled to said electrical connector, said electrical connector comprising:
    an electrical housing having an open end through which to fit to a mating hybrid connector and a wall at an end thereof opposite said open end, said wall having two optical connector mount sections and a terminal mount section between said optical connector mount sections, juxtaposed in a direction perpendicular to a connector fitting direction of said hybrid connector and said mating hybrid connector, and
    terminals bent L-shaped which are inserted at one end through said terminal mount section into said electrical housing to have bends thereof located outside said terminal mount section, and said transmitting optical connector comprising:
        a transmitting optical housing with a light emitting element module receiving section; and
        a light emitting element module having a light emitting element, which is accommodated in said light emitting element module receiving section of said transmitting optical housing, and said receiving optical connector comprising:
        a receiving optical housing with a light receiving element module receiving section; and
        a light receiving element module having a light receiving element, which is accommodated in said light receiving element module receiving section of said receiving optical housing,
        wherein when said transmitting and receiving optical connectors are assembled through said respective optical connector mount sections to said electrical connector, said transmitting and receiving optical housings overlie at said light emitting element module and light receiving element module receiving sections at said bends of said terminals, with a spacing therebetween.

5. The hybrid connector according to claim 4, wherein said light emitting element is located off-center in said light emitting element module toward away from said terminals, and said light receiving element is located off-center in said light receiving element module toward away from said terminals.

* * * * *